(12) United States Patent
Lindheimer et al.

(10) Patent No.: US 11,129,090 B2
(45) Date of Patent: Sep. 21, 2021

(54) RNA CONFIGURATION SIGNALLING OPTIMIZATION

(71) Applicant: Telefonaktiebolaget LM Ericsson (publ), Stockholm (SE)

(72) Inventors: Christofer Lindheimer, Linköping (SE); Icaro L. J. da Silva, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 145 days.

(21) Appl. No.: 16/343,029

(22) PCT Filed: Mar. 14, 2019

(86) PCT No.: PCT/SE2019/050228
§ 371 (c)(1),
(2) Date: Apr. 18, 2019

(87) PCT Pub. No.: WO2019/194718
PCT Pub. Date: Oct. 10, 2019

(65) Prior Publication Data
US 2020/0267632 A1  Aug. 20, 2020

Related U.S. Application Data
(60) Provisional application No. 62/653,082, filed on Apr. 5, 2018.

(51) Int. Cl.
H04W 48/16 (2009.01)
H04W 76/27 (2018.01)
(Continued)

(52) U.S. Cl.
CPC ........... *H04W 48/16* (2013.01); *H04W 48/18* (2013.01); *H04W 60/00* (2013.01); *H04W 76/27* (2018.02); *H04W 84/042* (2013.01)

(58) Field of Classification Search
CPC ..... H04W 48/16; H04W 76/27; H04W 48/18; H04W 60/00; H04W 84/042
See application file for complete search history.

(56) References Cited

U.S. PATENT DOCUMENTS

2017/0013510 A1* 1/2017 Jung ...................... H04W 48/10
2018/0270895 A1* 9/2018 Park ...................... H04W 76/38
(Continued)

OTHER PUBLICATIONS
"On configuration of RNA as subset of the registration area", 3GPP TSG-RAN WG2 #97; R3-173032; Berlin, Germany, Aug. 21-25, 2017, pp. 1-3.
(Continued)

*Primary Examiner* — Duc C Ho
(74) *Attorney, Agent, or Firm* — Murphy, Bilak & Homilier, PLLC

(57) ABSTRACT

Embodiments described herein provide methods and apparatus for determining a radio access network notification area, RNA, in a wireless communications network. A method in a wireless device comprises receiving an indication of the RNA, wherein the indication comprises a public land mobile network code, PLMN associated with a plurality of tracking area codes, TACs; and determining based on the RNA indication, a plurality of tracking area identifiers comprising each of the plurality of TACs and their associated PLMN.

12 Claims, 26 Drawing Sheets

---

2602
First step of Method
Receive an indication of the RNA, wherein the indication comprises a public land mobile network code, PLMN associated with a plurality of tracking area codes, TACs

2604
Determine based on the RNA indication, a plurality of tracking area identifiers comprising each of the plurality of TACs and their associated PLMN.

(51) Int. Cl.
*H04W 48/18* (2009.01)
*H04W 60/00* (2009.01)
*H04W 84/04* (2009.01)

(56) References Cited

U.S. PATENT DOCUMENTS

2019/0059128 A1* 2/2019 Gage ............... H04W 52/0206
2020/0137680 A1* 4/2020 Byun .................. H04W 48/16

OTHER PUBLICATIONS

"RAN notification area configuration", 3GPP TSG-RAN WG2 AH 1801; R2-1800503; Vancouver, Canada, Jan. 22-26, 2018, pp. 1-5.

"RAN Notification Area configuration", 3GPP TSG-RAN WG2 #99bis; Tdoc R2-1710829; (Revision of R2-1707845); Prague, Czech Republic, Oct. 9-13, 2017, pp. 1-4.

"RAN Notification Area Configuration in NR", 3GPP TSG-RAN WG2 #101; R2-1801953; Resubmission of R2-1801302; Athens, Greece, Feb. 26-Mar. 2, 2018, pp. 1-3.

"TP on RAN notification area configuration", 3GPP TSG RAN WG2 AH 1801; R2-1800916; Vancouver, Canada, Jan. 22-26, 2018, pp. 1-6.

"3GPP TS 38.300 V15.1.0"; 3rd Generation Partnership Project; Technical Specification Group Radio Access Network; NR; NR and NG-RAN Overall Description; Stage 2 (Release 15), Mar. 2018, pp. 1-71.

"3GPP TS 38.331 V15.1.0"; 3rd Generation Partnership Project; Technical Specification Group Radio Access Network; NR; Radio Resource Control (RRC) protocol specification (Release 15), Mar. 2018, pp. 1-268.

"3GPP TS 38.304 v1.0.0"; 3rd Generation Partnership Project; Technical Specification Group Radio Access Network; NR; User Equipment (UE) procedures in Idle mode and RRC Inactive state (Release 15); Mar. 2018, pp. 1-21.

"3GPP TS 23.501 V15.1.0"; 3rd Generation Partnership Project; Technical Specification Group Services and System Aspects; System Architecture for the 5G System; Stage 2 (Release 15), Mar. 2018, pp. 1-201.

"3GPP TS 24.301 V15.2.0", 3rd Generation Partnership Project; Technical Specification Group Core Network and Terminals; Non-Access-Stratum (NAS) protocol for Evolved Packet System (EPS); Stage 3 (Release 15), Mar. 2018, pp. 1-514.

* cited by examiner

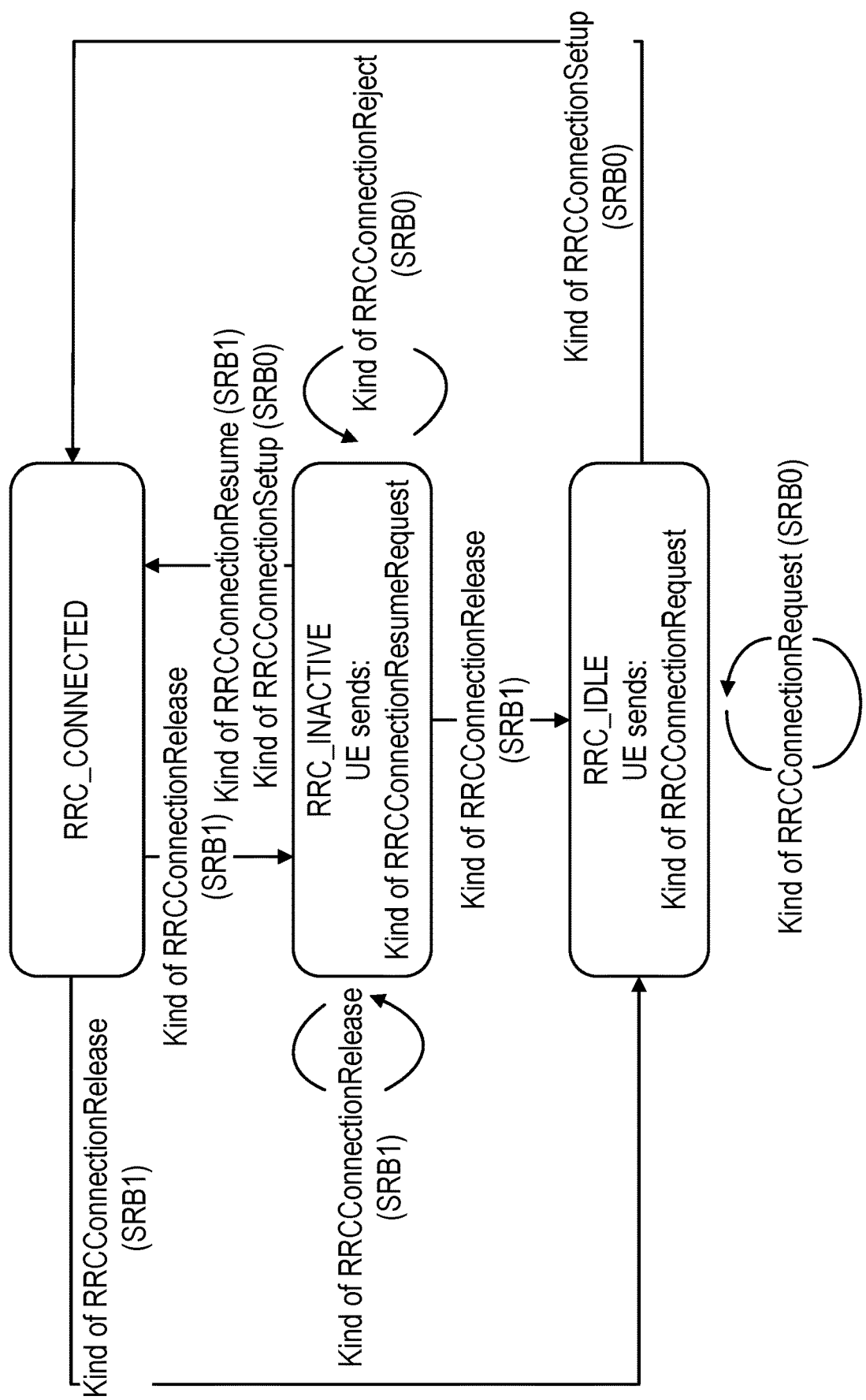
Fig. 4 - Prior Art -

| 8 | 7 | 6 | 5 | 4 | 3 | 2 | 1 | |
|---|---|---|---|---|---|---|---|---|
| Tracking area identity IE ||||||||octet 1 |
| MCC digit 2 |||| MCC digit 1 |||| octet 2 |
| MCC digit 3 |||| MCC digit 3 |||| octet 3 |
| MCC digit 2 |||| MCC digit 1 |||| octet 4 |
| TAC ||||||||octet 5 |
| TAC (continued) ||||||||octet 6 |

Fig. 5
- Prior Art -

| 8 | 7 | 6 | 5 | 4 | 3 | 2 | 1 | |
|---|---|---|---|---|---|---|---|---|
| Tracking area identity IE ||||||||octet 1 |
| Length of tracking area identity list contents ||||||||octet 2 |
| Partial tracking area identity list 1 ||||||||octet 3 — octet i |
| Partial tracking area identity list 2 ||||||||octet i+1* — octet l* |
| ... ||||||||octet l+1* — octet m* |
| Partial tracking area identity list p ||||||||octet m+1* — octet n* |

Fig. 6
- Prior Art -

| 8 | 7 | 6 | 5 | 4 | 3 | 2 | 1 | |
|---|---|---|---|---|---|---|---|---|
| 0 Spare | Type of list | | Number of elements | | | | | octet 1 |
| MCC digit 2 | | | | MCC digit 1 | | | | octet 2 |
| MCC digit 3 | | | | MCC digit 3 | | | | octet 3 |
| MCC digit 2 | | | | MCC digit 1 | | | | octet 4 |
| TAC 1 | | | | | | | | octet 5 |
| TAC 1 (continued) | | | | | | | | octet 6 |
| ... | | | | | | | | ... |
| ... | | | | | | | | ... |
| TAC k | | | | | | | | octet 2k+3* |
| TAC k (continued) | | | | | | | | octet 2k+4* |

Fig. 7
- Prior Art -

| 8 | 7 | 6 | 5 | 4 | 3 | 2 | 1 | |
|---|---|---|---|---|---|---|---|---|
| 0 Spare | Type of list | | Number of elements | | | | | octet 1 |
| MCC digit 2 | | | | MCC digit 1 | | | | octet 2 |
| MCC digit 3 | | | | MCC digit 3 | | | | octet 3 |
| MCC digit 2 | | | | MCC digit 1 | | | | octet 4 |
| TAC 1 | | | | | | | | octet 5 |
| TAC 1 (continued) | | | | | | | | octet 6 |

Fig. 8
- Prior Art -

| 8 | 7 6 | 5 4 3 2 1 | |
|---|---|---|---|
| 0 Spare | Type of list | Number of elements | octet 1 |
| MCC digit 2 | | MCC digit 1 | octet 2 |
| MCC digit 3 | | MCC digit 3 | octet 3 |
| MCC digit 2 | | MCC digit 1 | octet 4 |
| TAC 1 ||| octet 5 |
| TAC 1 (continued) ||| octet 6 |
| MCC digit 2 | | MCC digit 1 | octet 7* |
| MCC digit 3 | | MCC digit 3 | octet 8* |
| MCC digit 2 | | MCC digit 1 | octet 9* |
| TAC 2 ||| octet 10* |
| TAC 2 (continued) ||| octet 11* |
| ... ||| ... |
| ... ||| |
| MCC digit 2 | | MCC digit 1 | octet 5k-3* |
| MCC digit 3 | | MCC digit 3 | octet 5k-2* |
| MCC digit 2 | | MCC digit 1 | octet 5k-1* |
| TAC k ||| octet 5k |
| TAC k (continued) ||| octet 5k+1* |

Fig. 9
- Prior Art -

3002
First step of Method
Transmit an indication of the RNA, wherein the indication comprises a public land mobile network, PLMN, code associated with a plurality of tracking area codes, TACs, to the wireless device.

Fig. 30

RNA CONFIGURATION SIGNALLING OPTIMIZATION

TECHNICAL FIELD

Embodiments described herein relate to methods and apparatus for determining a radio access network notification area, RNA, in a wireless communications network.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In the new 5G standard, the system and architecture for 5G and various state machines is described. One "state machine" is the connection management state model or CM-state model, described in 3GPP TS 23.501 v15.1.0. Generally, connection management comprises of functions for establishing and releasing signaling connections between a wireless device and a core network node, for 5G this node is called AMF, Access and Mobility Management Function.

FIG. 1 illustrates an example of a 5G system architecture, including network nodes (e.g., AMF, UE, (R)AN) and interface names.

This signaling connection over N1 may be used to enable Non-Access-Stratum (NAS) signaling exchanges between the UE (or wireless device) and the AMF in the core network. The N1 signaling connection comprises both the signaling connection between the UE and the Radio Access Node (R(AN)) and the N2 connection, between the R(AN) and the AMF.

In the 5G architecture, there are two CM-states defined, CM-IDLE and CM-CONNECTED. A wireless device operating in CM-IDLE may have no NAS signaling connection established over N1 to the AMF and in this CM-state, the wireless device performs cell selection/reselection and PLMN selection. In addition, for a wireless device operating in CM IDLE there is no R(AN) signaling connection or N2/N3 connection. If the wireless device is registered to the network and in CM-IDLE; it may listen to and respond to paging messages from the network. This means that in CM-IDLE the wireless device is still reachable. If initiated by user/wireless device, the wireless device may also be able to perform a service request procedure.

A wireless device operating in CM-CONNECTED may be a wireless device that has established an radio access node (R(AN)) signaling connection between the wireless device and the AN, in other words it has entered a Radio resource control connected state, RRC_CONNECTED, over 3GPP access. Over this connection, as illustrated in FIG. 2, the wireless device may transmit an initial NAS message (for example a service request) and this message may initiate the transition from CM-IDLE to CM CONNECTED in the AMF. From FIG. 1, it is also realized that CM-CONNECTED may also require an N2 connection, between the R(AN) and the AMF. The reception of an initial N2 message (e.g., N2 Initial wireless device message) may initiate the transition for AMF from CM-IDLE to CM-CONNECTED.

In the CM-CONNECTED, the wireless device may transmit data, and it may be ready to enter CM-IDLE, whenever the R(AN) signalling connection is released, as illustrated in FIG. 2. The AMF may enter CM-IDLE whenever the logical N1 signalling connection and the N3 user plane connection are released, as illustrated in FIG. 3. In FIG. 3, the AMF enters CM-IDLE by releasing the N2 context. The AMF may then enter CM-CONNECTED by re-establishing the N2 context.

In a similar way as in the AMF, there is also a state model in the R(AN), the access network, described in detail in 3GPP TS 38.331 v15.1.0 (RRC specifications). Herein, the term "gNB" may be used to described the radio access node (R(AN)), but it may equally well be another node type, e.g., an ng-eNB, an eNB. The term "gNB" shall thus be considered an example, rather than a limitation in the applicability of the present invention. One state model in the gNB is the RRC State machine, as illustrated in FIG. 4.

From the R(AN) perspective, wireless devices may either be in RRC_CONNECTED, RRC_INACTIVE or RRC_IDLE. FIG. 4 illustrate how the RRC State machine may work and the messages which may be used to trigger/transition of the wireless device between the states. The indications in parenthesis (SRB0, SRB1) indicate which signalling radio bearers may be used to transition the wireless device between the states. The figure shows the principles for transition, not necessarily all the messages will have the same names in the final standard text.

A mapping between the different state machines, the one in the R(AN) and the one in AMF, is such that CM-CONNECTED may map to either RRC_CONNECTED or RRC_INACTIVE—while CM-IDLE may always map to RRC_IDLE.

A wireless device may be in RRC_CONNECTED or in RRC_INACTIVE when an RRC connection has been established. If this is not the case, i.e. no RRC connection is established, the wireless device may be in RRC_IDLE state. These different states are further described in 3GPP TS 38.331 v15.1.0.

In particular, the RRC_CONNECTED may be considered to be an example of a mode of operation which is optimized for uplink and downlink data transfer. The RRC_INACTIVE may be considered to be an example of a connected mode which is optimized for lower power consumption. RRC_IDLE may be considered to be an example of a disconnected mode optimized for lower power consumption.

In RRC_IDLE, the wireless device may be configured to listen to a paging channel at certain occasions and it may perform cell (re)selection procedures and listen to system information. In RRC_INACTIVE, the wireless device may also listen to paging channel and may perform cell (re) selection procedures, but in addition, the wireless device may maintains a configuration and the configuration may also kept on the network side, such that, when needed, for example, when data arrives to the wireless device, a complete setup procedure is not required to start transmitting data.

In RRC_CONNECTED, there may be a transfer of data to or from the wireless device and the network may control the mobility. This means that the network controls when the wireless device performs handover to other cells. In RRC_CONNECTED, the wireless device may still monitor the paging channel and it may monitor control channels depending on whether there is data for the wireless device or not. The wireless device may also provide channel quality and feedback information to the network and it may perform neighboring cell measurements and report these measurements to the network.

When a wireless device is operating in CM-CONNECTED and RRC_INACTIVE the following applies:
  The wireless device's reachability is managed by the radio access network, RAN, with assistance information from core network;
  The wireless device's paging is managed by the radio access network.
  The wireless device monitors for paging with wireless device's CN Identity (5G SAE-Temporary Mobile Subscriber Identity S-TMSI) and a radio access network identifier (for example an INACTIVE radio network temporary Identifier, I-RNTI)

The AMF, based on the network configuration, may provide assistance information to the Next Generation Radio access network (NG-RAN), to assist the NG-RAN's decision as to whether the wireless device can be sent to RRC_INACTIVE. The assistance information ("RRC Inactive assistance information") can for example include:
  The wireless device's specific DRX values.
  The core network Registration Area provided to the wireless device, sometimes referred to as TAI-list (TrackingAreaIdentifier List);
  Periodic Registration Update timer
  If the AMF has enabled mobile initiate connection only (MICO) mode for the wireless device, an indication that the wireless device is in MICO mode.
  Information from the wireless device permanent identifier, as defined in TS 38.304 v1.0.0, that allows the RAN to calculate the wireless device's RAN paging occasions.

The RRC Inactive assistance information mentioned above is provided by the AMF during N2 activation with the (new) serving NG-RAN node (i.e. during Registration, Service Request, handover) to assist the NG RAN's decision whether the wireless device can be sent to RRC_INACTIVE. RRC_INACTIVE state is part of RRC state machine, and it is up to the NG-RAN to determine the conditions to enter RRC_INACTIVE. If any of the parameters included in the RRC Inactive Assistance Information changes as the result of NAS procedure, the AMF shall provide updated the RRC Inactive Assistance Information to the NG-RAN node.

The state of the N2 and N3 reference points are not changed by the wireless device entering CM-CONNECTED with RRC_INACTIVE. A wireless device operating in RRC_INACTIVE is aware of the RAN Notification area (RNA).

RNA Configuration in RRC_INACTIVE

A wireless device operating in RRC_INACTIVE may be configured with an RNA (RAN-based Notification Area), where:
  the RNA can cover a single or multiple cells, and can be smaller than CN Registration area;
  a RAN-based notification area update (RNAU) may be periodically sent by the wireless device and may also be sent when the cell reselection procedure of the wireless device selects a cell that does not belong to the configured RNA.

There are several different alternatives on how the RNA can be configured:
  A List of cells transmitted to the wireless device. In other words, a wireless device is provided an explicit list of cells (one or more) that constitute the RNA.
  A List of RAN areas. In other words the wireless device is provided at least one RAN area ID, where a RAN area is a subset of a CN Tracking Area. The wireless device may obtain the list of RAN areas from the cell which broadcasts at least one RAN area ID in the system information so that a wireless device knows which area the cell belongs to.
  A List of TAI (Tracking Area Identifiers).

The wireless device entering RRC_INACTIVE from RRC_CONNECTED may receive the RNA configuration in the so called RRCSuspend (or alternatively, an RRCRelease with a suspend indication) message. The RNA configuration may be considered in some examples as a mandatory field in that message, i.e., every time that the network moves the wireless device to RRC_INACTIVE the RNA configuration is provided. The RNA that is configured to the wireless device according to the above description, is, as is described, a subset of cells from the CN registration area. The RNA may not include cells that are not also part of the CN registration area. The CN Registration area may be signaled to the wireless device as a TAI list, over the N1 interface.

NAS Signaling and Configuration of TAI Lists

In CM-IDLE, it is the core network that is in charge of the wireless device's reachability and the core network does this through configuring a CN registration area that is defined by a set of Tracking Areas (TA)'s. The wireless device may be configured with the CN registration area through a list of Tracking Area Identifiers, TAI's, and this CN Registration area is herefrom referred to as "TAI-list".

The NAS signaling is defined in 3GPP TS 24.301 v15.2.0. A copy of how the TAI List is defined and signaled may be found below.

The tracking areas that are part of a CN registration area may be signaled to the wireless device in a Tracking Area Identity List.

The purpose of the Tracking area identity information element is to provide an unambiguous identification of tracking areas within the area covered by the 3GPP system.

The Tracking area identity information element may be coded as shown in FIG. 5.

TABLE 1

Tracking area identity information element

MCC, Mobile country code (octet 2 and 3)
The MCC field is coded as in ITU-T Rec. E212 [30], annex A.
If the TAI is deleted the MCC and MNC shall take the value from the deleted TAI.
In abnormal cases, the MCC stored in the UE can contain elements not in the set
{0, 1 . . . 9}. In such cases the UE should transmit the stored values using full
hexadecimal encoding. When receiving such an MCC, the network shall treat the
TAI as deleted.

TABLE 1-continued

Tracking area identity information element

MNC, Mobile network code (octet 3 bits 5 to 8, octet 4)
The coding of this field is the responsibility of each administration, but BCD coding shall be used. The MNC shall consist of 2 or 3 digits. For PCS 1900 for NA, Federal regulation mandates that a 3-digit MNC shall be used. However a network operator may decide to use only two digits in the MNC in the TAI over the radio interface. In this case, bits 5 to 8 of octet 3 shall be coded as "1111". Mobile equipment shall accept a TAI coded in such a way.
In abnormal cases, the MNC stored in the UE can have:
digit 1 or 2 not in the set {0, 1 . . . 9}, or
digit 3 not in the set {0, 1 . . . 9, F} hex.
In such cases the UE shall transmit the stored values using full hexadecimal encoding. When receiving such an MNC, the network shall treat the TAI as deleted. The same handling shall apply for the network, if a 3-digit MNC is sent by the UE to a network using only a 2-digit MNC.
TAC, Tracking area code (octet 5 and 6)
In the TAC field bit 8 of octet 5 is the most significant bit and bit 1 of octet 6 the least significant bit.
The coding of the tracking area code is the responsibility of each administration except that two values are used to mark the TAC, and hence the TAI, as deleted. Coding using full hexadecimal representation may be used. The tracking area code consists of 2 octets.
If a TAI has to be deleted then all bits of the tracking area code shall be set to one with the exception of the least significant bit which shall be set to zero. If a USIM is inserted in a mobile equipment with the tracking area code containing all zeros, then the mobile equipment shall recognise this TAC as part of a deleted TAI.

Table 1 describes the TAI information element.

Tracking Area Identity List

The purpose of the Tracking area identity, TAI, list information element is to transfer a list of tracking areas from the network to the wireless device. The coding of the information element allows combining different types of lists. The lists of type "00" and "01" allow a more compact encoding, when the different TAIs are sharing the Public Land Mobile Network (PLMN) identity.

The Tracking area identity list information element may be coded as shown in FIG. 6, FIG. 7, FIG. 8, FIG. 9 and table 2.

The Tracking area identity list is a type 4 information element, with a minimum length of 8 octets and a maximum length of 98 octets. The TAI list may contain a maximum of 16 different tracking area identities.

TABLE 2

Tracking area identity list information element

Value part of the Tracking area identity list information element (octet 3 to n)
The value part of the Tracking area identity list information element consists of one or several partial tracking area identity lists. The length of each partial tracking area identity list can be determined from the 'type of list' field and the 'number of elements' field in the first octet of the partial tracking area identity list.
The UE shall store the complete list received. If more than 16 TAIs are included in this information element, the UE shall store the first 16 TAIs and ignore the remaining octets of the information element.
Partial tracking area identity list:
Type of list (octet 1)
Bits
7 6
0 0 list of TACs belonging to one PLMN, with non-consecutive TAC values
0 1 list of TACs belonging to one PLMN, with consecutive TAC values
1 0 list of TAIs belonging to different PLMNs (see NOTE)
All other values are reserved.
Number of elements (octet 1)

TABLE 2-continued

Tracking area identity list information element

Bits
5 4 3 2 1
0 0 0 0 0       1 element
0 0 0 0 1       2 elements
0 0 0 1 0       3 elements
...
0 1 1 0 1       14 elements
0 1 1 1 0       15 elements
0 1 1 1 1       16 elements
All other values are unused and shall be interpreted as 16, if received by the UE.
Bit 8 of octet 1 is spare and shall be coded as zero.
For type of list = "00" and number of elements = k:
octet 2 to 4 contain the MCC+MNC, and
for j = 1, k:
octet 2j+3 and 2j+4 contain the TAC of the j-th TAI belonging to the partial list,
For type of list = "01" and number of elements = k:
octet 2 to 4 contain the MCC+MNC, and
octet 5 and 6 contain the TAC of the first TAI belonging to the partial list.
The TAC values of the other k−1 TAIs are TAC+1, TAC+2, ..., TAC+k−1.
For type of list = "10" and number of elements = k:
for j = 1, k.
octet 5j−3 to 5j−1 contain the MCC+MNC, and
octet 5j and 5j+1 contain the TAC of the j-th TAI belonging to the partial list.
MCC, Mobile country code
The MCC field is coded as in ITU-T Recommendation E.212 [30], annex A.
MNC, Mobile network code
The coding of this field is the responsibility of each administration but BCD coding shall be used. The MNC shall consist of 2 or 3 digits. If a network operator decides to use only two digits in the MNC, MNC digit 3 shall be coded as "1111".

TABLE 2-continued

Tracking area identity list information element

TAC, Tracking area code
In the TAC field bit 8 of the first octet is the most significant bit and bit 1 of second octet the least significant bit.
The coding of the tracking area code is the responsibility of each administration. Coding using full hexadecimal representation may be used. The tracking area code consists of 2 octets.

NOTE:
If the "list of TAIs belonging to different PLMNs" is used, the PLMNs included in the list need to be present in the list of "equivalent PLMNs".

There currently exist certain challenge(s).

Wireless devices operating in RRC_INACTIVE may perform Tracking Area Update (TAU) triggered by mobility, i.e., when selecting/re-selecting a cell that broadcasts a TAI that is not part of the TAI list configured at the wireless device's NAS layer. Hence, in RRC_INACTIVE, the wireless device's NAS layer maintains a TAI list configured by the network or, in other words, signaling of Tracking Area Identifiers List is specified in the NAS protocol, possibly provided at every Tracking Area Update performed by an RRC_IDLE or an RRC_INACTIVE wireless device.

For the RNA configuration the following may be applied:
1: For cell lists approach, RNA may contain cells that belong to the same PLMN
2: a maximum number of cells in RAN notification area may be 32;
3: NR Cell Identity (36 bits) may be used as cell identity for cell list approach;
4: a maximum number of RAN Area IDs configured in one RNA is may be 32
5: A radio access network area code RANAC size may be 6 to 8 bits
6: For one cell, only 1 RANAC may be broadcasted. A single RANAC is common for all PLMNs sharing the RAN.
7 RANAC is optional field in SIB1.
8 maximum 16 TAIs may be configured in one RAN notification area;
9 ASN.1 may be agreed as a baseline.
10 RNA may be mandatory configured for the inactive wireless devices for Rel-15.

The signalling assumed as "baseline", interpreted as a starting point for discussions, associated to agreement 9 is the following:

```
RAN-NotificationAreaInfo    ::= CHOICE {
    cellList                    SEQUENCE (SIZE (1..32)) OF CellIdentity,
    ran-AreaConfigList          RAN-AreaConfigList,
}
RAN-AreaConfigList ::=          SEQUENCE (SIZE (1..16)) OF RAN-AreaConfig
RAN-AreaConfig    ::=           SEQUENCE {
    trackingAreaCode                TrackingAreaCode
    ran-AreaCodeList                SEQUENCE (SIZE (1..32)) OF  RAN-AreaCode   OPTIONAL
}
RAN-AreaCode::=                 BIT STRING (SIZE (6))
```

However, the stage-2 specifications, 3GPP TS 38.300 v15.1.0, describe the configuration of RAN areas as follows:
There are several different alternatives on how the RNA can be configured:
List of cells:
A UE is provided an explicit list of cells (one or more) that constitute the RNA.
List of RAN areas:
A UE is provided with (at least one) RAN area ID, where a RAN area is a subset of a CN Tracking Area or equal to a CN Tracking Area. A RAN area is specified by one RAN area ID, which consists of a TAI and optionally a RAN area Code;
A cell broadcasts a RAN area ID in the system information.

NG RAN may provide different RNA configurations (or definitions) to different UEs but may not provide different configurations to the same UE at the same time. A UE may support all RNA configuration options listed above.

Hence, there seems to be an inconsistency between 38.300 and the ASN.1 structure of the RAN-AreaConfig in the so-called baseline, where Tracking Area code is used instead of the Tracking Area Identifiers (which also includes PLMN information). Notice that is also inconsistent with the agreement that a maximum number of 16 TAIs may be configured in one RAN notification area. Another problem is that when the 3 options have been agreed, it has been explicitly described that mixed options (e.g. list of TAIs and RANACs) in the same configuration may not be supported, although the current signaling, in principle would allow this.

Assuming now that each RAN Area in the configured list needs to indicate a TAI for a set of possibly configured RANACs, in the case of RAN IDs (and not cell lists), a corrected "baseline" signalling, may instead look more like:

```
RAN-NotificationAreaInfo        ::= CHOICE {
    cellList                        SEQUENCE (SIZE (1..32)) OF CellIdentity,
    ran-AreaConfigList              RAN-AreaConfig List,
}
RAN-AreaConfigList ::=              SEQUENCE (SIZE (1..16)) OF RAN-AreaConfig
RAN-AreaConfig   ::=            SEQUENCE {
    tai-Indicator                   TAI-Indicator
    ran-AreaCodeList                SEQUENCE (SIZE (1..32)) OF   RAN-
AreaCode   OPTIONAL
}
RAN-AreaCode::=                     BIT STRING (SIZE (6))
```

Above we have used a generic information element called TAI-Indicator. This may be defined as the TAI itself, which comprises of a PLMN+Tracking Area Code (TAC), which would lead to a 6-octet field per RAN configuration area. Considering we may have up to 16 configured areas, this may lead to up to 6×8×16 bits just to configure the TAI part of the RNA configuration.

Designing the RRC signalling following that approach would not be efficient. This may be exacerbated by providing an RNA configuration every time the wireless device is suspended in the RRCSuspend (or RRCRelease with suspend indicator) message. The suspend procedure may usually be triggered by the network when the wireless device finishes a data transaction and more data is not expected soon. As most data sessions are rather short, this procedure will be triggered very often, and hence, the RNA configuration information possibly comprising a significant number of bytes may have to be repeated very often.

In other words, if the modified "baseline" approach is followed, by signalling the full TAI per RNA configuration, the following would be required:

In some embodiments, the TAI lists are organized per common entities such as a list of RAN configuration areas per PLMN, avoiding the repetition of elements. These embodiments are especially efficient in cases where there can be multiple TACs per PLMN, which can be a typical case.

According to one embodiment disclosed herein, when the RNA is signaled as a RAN Area List, according to the description above, reference to each TAI in each RNA configuration is being made using an pointer, e.g. an index or a bitmap, pointing to an element in the TAI list in NAS layer (that is signaled over the N1 interface or already stored at the UE's NAS layer). In this way, the number of bits used to signal a Tracking Area Code+PLMN is limited by the number of elements the TAI list contains. In some examples, the TAI list provided by NAS can contain up to 16 elements. Hence, only 4 bits may be used to encode each element in that list. In other words, 4 bits are used in each RNA configuration instead of 48 bits, only counting the TAI part. A possible ASN.1 encoding for that embodiment for the RRC specifications is shown below.

```
RAN-NotificationAreaInfo        ::= CHOICE {
    cellList                        SEQUENCE (SIZE (1..32)) OF CellIdentity,
    ran-AreaConfigList              RAN-AreaConfigList,
}
RAN-AreaConfigList ::=              SEQUENCE (SIZE (1..16)) OF RAN-AreaConfig
RAN-AreaConfig   ::=            SEQUENCE {
    tai-Indicator                   TAI-Indicator
    ran-AreaCodeList                SEQUENCE (SIZE (1..32)) OF   RAN-
AreaCode   OPTIONAL
}
RAN-AreaCode::=                     BIT STRING (SIZE (6))
TAI-Indicator::= INTEGER (1..16)
```

Repeating information already available at the UE (in NAS layer) in a much higher frequency rate, as with short data sessions there could be quite frequent suspend/resume procedures;

Delivering that area configuration in a more inefficient way compared to the NAS protocol.

Certain aspects of the present disclosure and their embodiments may provide solutions to these or other challenges.

SUMMARY

The embodiments described herein propose methods and apparatus for signaling of a RAN notification area. The method comprises efficient signaling of a RAN notification area, RNA, configuration that may point to already stored information at the wireless device e.g. provided by other protocol layers such as Non-Access Stratum. These embodiments explore the fact that the wireless device has already a TAI list provided by NAS protocol.

| RRCRelease field descriptions |
| --- |
| tai-Indicator |
| Configured when suspend indicator is included, that indicates the element in the TAI list provided by NAS that is used for a given RNA configuration in the RNA list. |

According to another embodiment of the present invention, RNA that maps to complete TA's are signaled as a bitmap to the UE, where the length of the bitmap corresponds to a maximum value of the amount of Tracking Areas that may be defined as the CN Registration Area, or TAI List. This also explorers the fact that an RRC_INACTIVE wireless device has available a TAI list provided by the NAS protocol. Notice that this second embodiment does not necessarily excludes the first one. A possible ASN.1 encoding for that embodiment for the RRC specifications showing both being implemented is shown below:

```
    RAN-NotificationAreaInfo       ::= CHOICE {
        cellList                       SEQUENCE (SIZE (1..32)) OF CellIdentity,
        ran-AreaConfigList             RAN-AreaConfigList,
        tai-List                       BIT STRING (SIZE (16))
    }
    RAN-AreaConfigList ::=             SEQUENCE (SIZE (1..16)) OF RAN-AreaConfig
    RAN-AreaConfig  ::=            SEQUENCE {
        tai-Indicator                  TAI-Indicator
        ran-AreaCodeList               SEQUENCE (SIZE (1..32)) OF  RAN-
AreaCode  OPTIONAL
    }
    RAN-AreaCode::=                    BIT STRING (SIZE (6))
    TAI-Indicator::= INTEGER (1..16)
```

As it can be seen, if the network chooses to define the RNA as a subset of the TAI list provided by NAS, without any RANAC, it can provide the bit string mapped to the TAI list provided by NAS, as described in the first embodiment.

In these embodiments therefore the wireless device may be configured to receive a tracking area identification, TAI, list identifying one or more tracking areas in a core network registration area, for example from the AMF; receive an indication of the, RNA from a base station wherein the indication of the RNA comprises a pointer which points to an element of the TAI list; and determine the RNA based on the element of the TAI list indicated by the pointer.

The base station may equivalently be configured to receive a tracking area identification, TAI, list associated with the wireless device identifying one or more tracking areas in a core network registration area; transmit an indication of the, RNA to the wireless device wherein the indication of the RNA comprises a pointer which points to an element of the TAI list.

According to yet another embodiment, the RNA configuration is defined per PLMN, so that we avoid repeating the PLMN for every TAI that needs to be configured. In that case, the list of RNA configuration is defined per PLMN, as follows:

```
    RAN-NotificationAreaInfo       ::= CHOICE {
        cellList                       SEQUENCE (SIZE (1..32)) OF CellIdentity,
        ran-AreaConfigList             RAN-AreaConfig List,
    }
    RAN-AreaConfigList ::=             SEQUENCE  (SIZE  (1..16))  OF  RAN-
AreaConfigPLMN
    RAN-AreaConfigPLMN ::= SEQUENCE (SIZE (1..X)) OF
    RAN-AreaConfigPerPLMN
    RAN-AreaConfigPerPLMN    ::=   SEQUENCE {
        plmn                           PLMN
    RAN-AreaConfig  ::=            SEQUENCE {
        tai-Indicator                  TRackingAreaCode
        ran-AreaCodeList               SEQUENCE (SIZE (1..32)) OF  RAN-
AreaCode  OPTIONAL
    }
    }
    RAN-AreaCode::=                    BIT STRING (SIZE (6))
```

In these embodiments therefore the wireless device may be configured to receive an indication of the RNA, wherein the indication comprises a public land mobile network, PLMN, code associated with a plurality of tracking area codes, TACs; and determine based on the RNA indication, a plurality of tracking area identifiers comprising each of the plurality of TACs and their associated PLMN.

In some examples, the indication of the RNA comprises a plurality of PLMNs each associated with a plurality of TACs. In some examples, the indication of the RNA further comprises at least one radio access network area code RANAC associated with each TAC.

The base station may be equivalently configured to transmit an indication of the RNA, wherein the indication comprises a public land mobile network, PLMN, code associated with a plurality of tracking area codes, TACs, to the wireless device.

The indication of the RNA may be transmitted to the wireless device as part of a control message instructing the wireless device to transition from a first mode of operation to a second mode of operation. For example, from RRC_CONNECTED or into RRC_INACTIVE.

There are, proposed herein, various embodiments which address one or more of the issues disclosed herein.

Certain embodiments may provide one or more of the following technical advantage(s).

For the embodiments where the wireless device is configured with a list of RAN area configurations per PLMN and each configuration has its own PLMN, the benefit is to avoid repeating the PLMN in every TAI. Solution is mainly beneficial in the case of a TAI list with TACs with the same PLMN, which is perhaps a typical scenario.

With the embodiments of the present invention, the RNA defined as one or several RAN Areas, may be efficiently signaled to the wireless device in the suspend message without unnecessarily repeating information that is anyway available at the wireless device. Compared to a very large RNA, there are hundreds of bits saved in utilizing the present invention. That is even more efficient deliver that takes advantage that the wireless device has already a list of TAIs and, that the RAN Areas are anyway a subset of these, in a more granular fashion.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

BRIEF DESCRIPTION OF THE DRAWINGS

The invention will now be described in further detail, using references to the following figures in which:

FIG. 4 illustrates an Radio Resource Control State machine;

FIG. 5 illustrates a tracking area identity information element;

FIG. 6 illustrates a tracking area identity information element;

FIG. 7 illustrates a tracking area identity information element;

FIG. 8 illustrates a tracking area identity information element;

FIG. 9 illustrates a tracking area identity information element;

FIG. 30 illustrates a method in accordance with some embodiments;

DESCRIPTION

Figure 1:
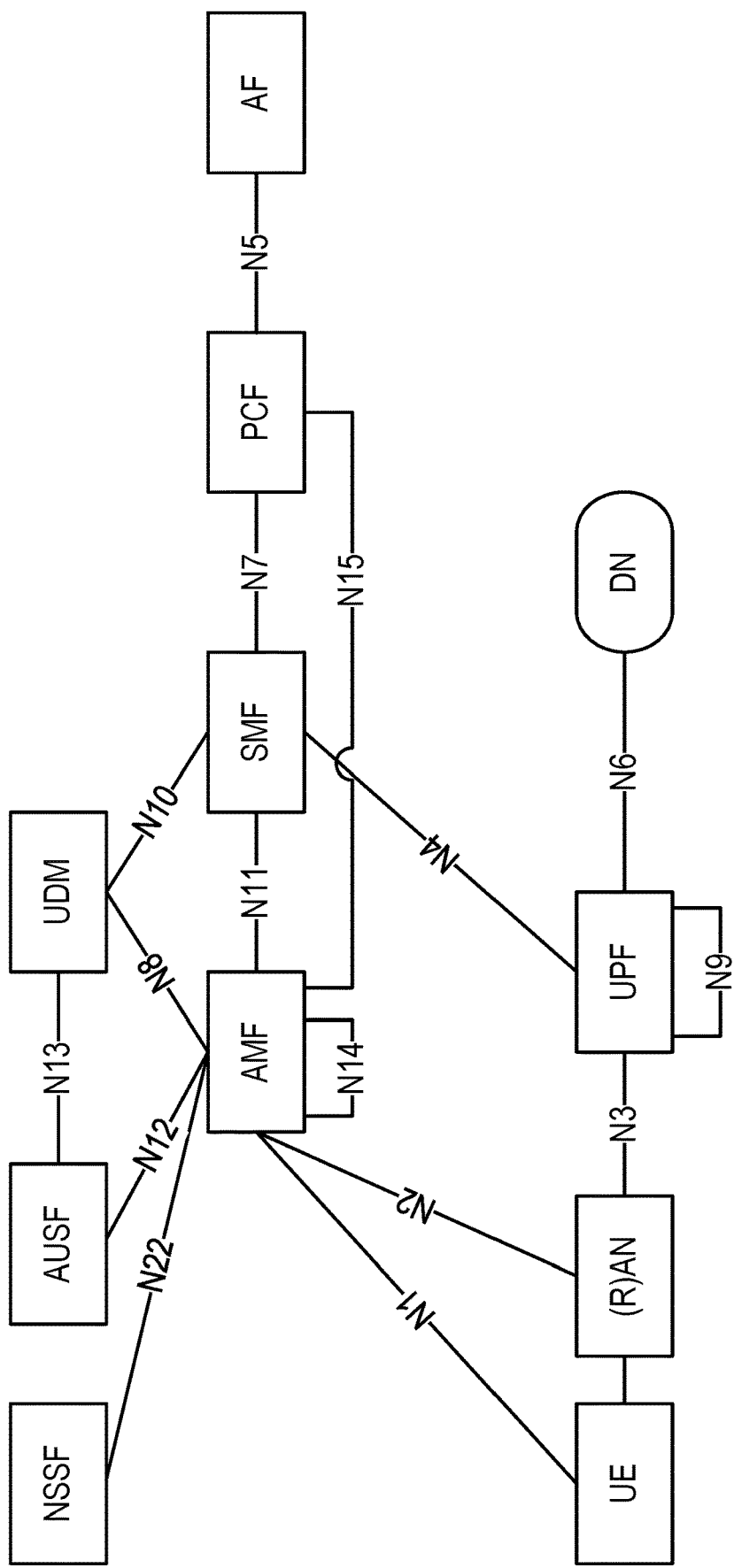
FIG. 1 illustrates an example of a 5G system architecture, including network nodes and interface names.
Figure 2:
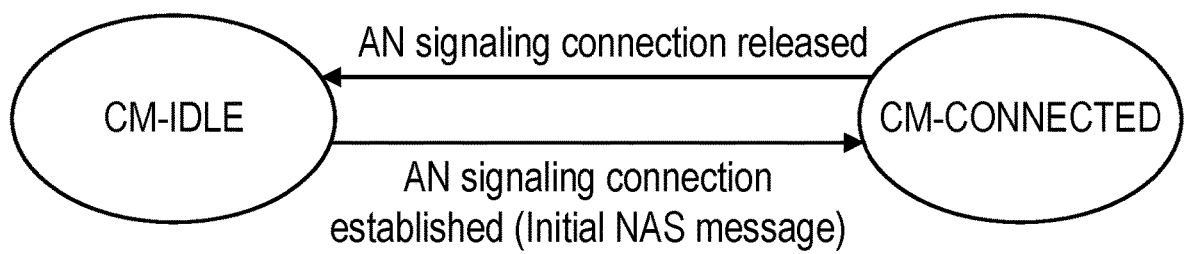
FIG. 2 illustrates the release of a signaling connection.
Figure 3:
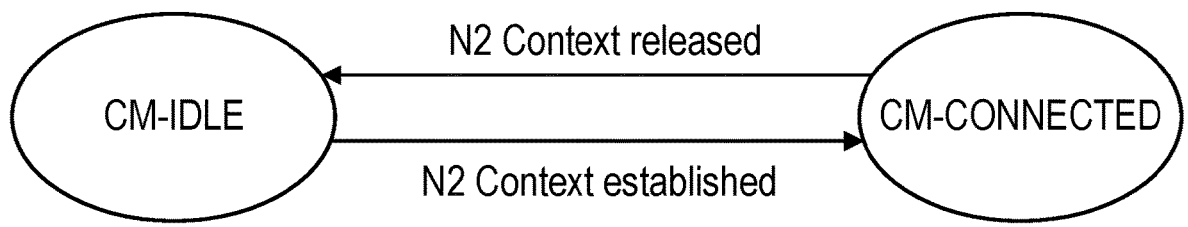
FIG. 3 illustrates the release of the logical N1 signalling connection and the N3 user plane connection.
Figure 10:
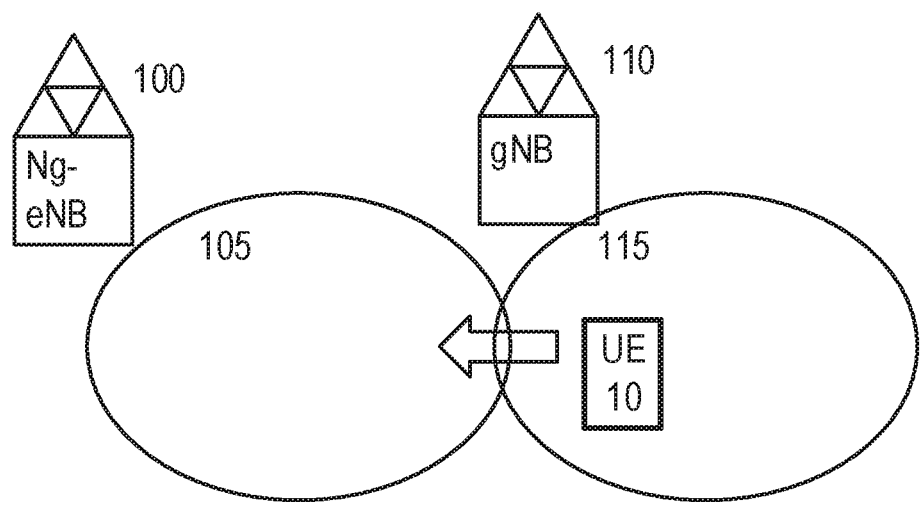
FIG. 10 illustrates a network portion according to one aspect of the present invention

FIG. 10 illustrates two different cells 105, 115, served by nodes or base stations 100 and 110 respectively. Node 100 is an ng-eNB offering access through Long Term Evolution (LTE) air interface and Node 110 is a gNB offering access through a New Radio (NR) air interface. The radio spectrum used in cell 105 and 115 may be the same or different. Further, the spectrum bands may be the same or different. For example, cell 105 may utilize bands in the 2 GHz spectrum regime whereas cell 115 may offer access through spectrum in other bands, like the 3.5, 5, 6, 28 or 60 GHz band.

A wireless device 10, is moving from cell 115 to cell 105. Dependent on what operating mode (or operating state) the wireless device is in different things will happen when wireless device enters cell 105.

If the wireless device is in RRC_IDLE, it will ultimately reselect to cell 105 and continue to be in RRC_IDLE. If the wireless device is in RRC_CONNECTED, a handover between cell 115 and 105 will take place, typically after the wireless device makes measurements and reports to cell 115.

If the wireless device is in RRC_INACTIVE, similarly to RRC_IDLE, the wireless device may reselect to cell 105.

Figure 11:
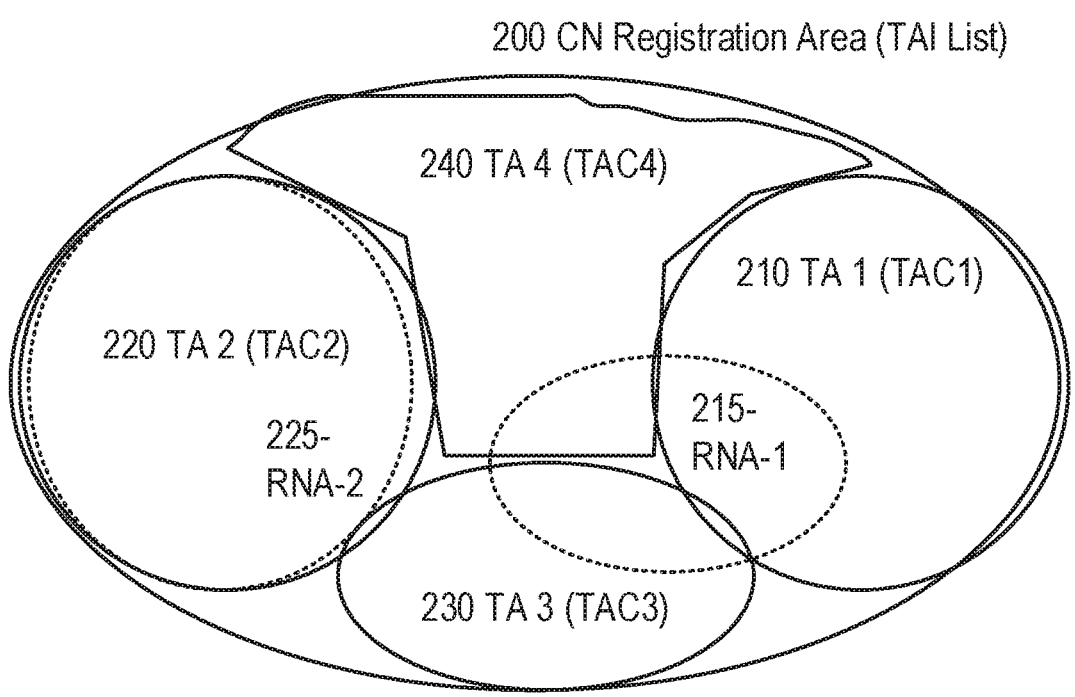
FIG. 11 illustrates the relation between an RNA and TA's

FIG. 11 illustrates the concept of registration areas, tracking areas and RAN-based Notification Areas, according to various embodiments of the present invention.

A wireless device is configured with a Core Network registration area through signaling of a TAI List, for example from the AMF. This is illustrated as the outer area, 200. The TAI list and how this is signaled is described above. As this TAI list is also transmitted to the NG-RAN, the base station may also have received the TAI list associated with the wireless device, and may therefore use this list to indicate the RNA to the wireless device.

The TAI list may include a list of Tracking Area Identifiers, where each Tracking Area Identifier consist of a PLMN portion and a Tracking Area Code, a TAC. The TAI list identifies thus a number of Tracking areas, in the figure illustrated as TA1-TA4 (210, 220, 230, 240). This is the area assigned to the certain wireless device to be registered in. In short, this means that as long as the wireless device doesn't leave this area, there is no need to perform any area updates to the core network due to mobility. In CM-IDLE it is still necessary to occasionally perform periodic updates, to let the network know the wireless device is still there.

To keep track of the wireless device in this way may be important since the core network may need to know where to page the wireless device in case there are incoming calls/connection requests. (So-called mobile-terminating calls)

While being in the CN Registration area 200, the wireless device may mostly be idle, but according to agreed cycles, it may listen to paging channels. The network will thus be able to reach the wireless device by transmitting pages in these paging cycles.

In RRC_INACTIVE, paging of wireless devices is the responsibility of the RAN. The core network will not perform paging. From the core network perspective, the wireless device is connected while in RRC_INACTIVE. A wireless device in RRC_INACTIVE shall still though perform Tracking Area Updates, TAU, when leaving the CN Registration Area, 200. This may also occur for a wireless device in CM-CONNECTED.

For RAN paging, it is rather the RNA, the RAN-based Notification Area that is of importance. In FIG. 11, one such RNA is illustrated, RNA-1 215. The RNA-1 215 may consist of cells from, e.g., tracking areas TA 1, TA 3 and TA 4, or it may consist of cells from any other area within the TAI-list. It may be only one cell or it may be several, up to all the cells constituting the complete TAI-list. In FIG. 11, the RNA-1 is illustrated as a portion of TA 1, TA 3 and TA 4 mainly.

Figure 12:
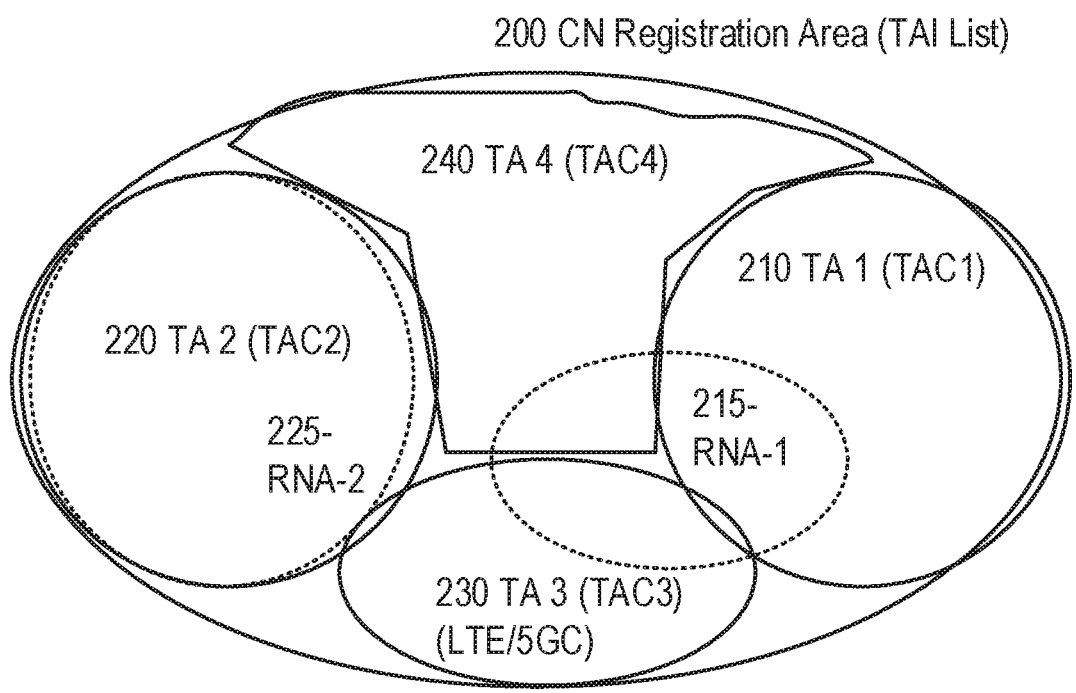
FIG. 12 illustrates inter-RAT aspects of RNA

FIG. 12 illustrates that for CN registration area 200, in the TAI-list (TA1-TA4) there can be a mix of TA's of different types of accesses. This means that there can be a mix of cells using different radio accesses for communication between network access nodes and wireless devices. In the example in FIG. 12, it is illustrated that TA d3 is a TA where cells deploy LTE for connecting to the 5G Core network, whereas in the other TA's (TA 1, TA 2 and TA 4) it is assumed that it is NR access (even though not explicitly stated). Alternatively, there may also be single TA's that include cells of different accesses. In this example though, different TA's can have different accesses. FIG. 12 also illustrates how RNA-1, 215 includes cells with different radio accesses, thus also served by different access nodes. Cells in TA 1 and TA 4 may be served by gNB's, whereas cells belonging to TA 3 may be served by ng-eNB's. FIG. 11 and FIG. 12 illustrate an RNA where it is illustrated that only a subset of cells from three different TA's are part of the RNA. In such situations it make sense to use a cell list to define the RNA-1.

Figure 13:
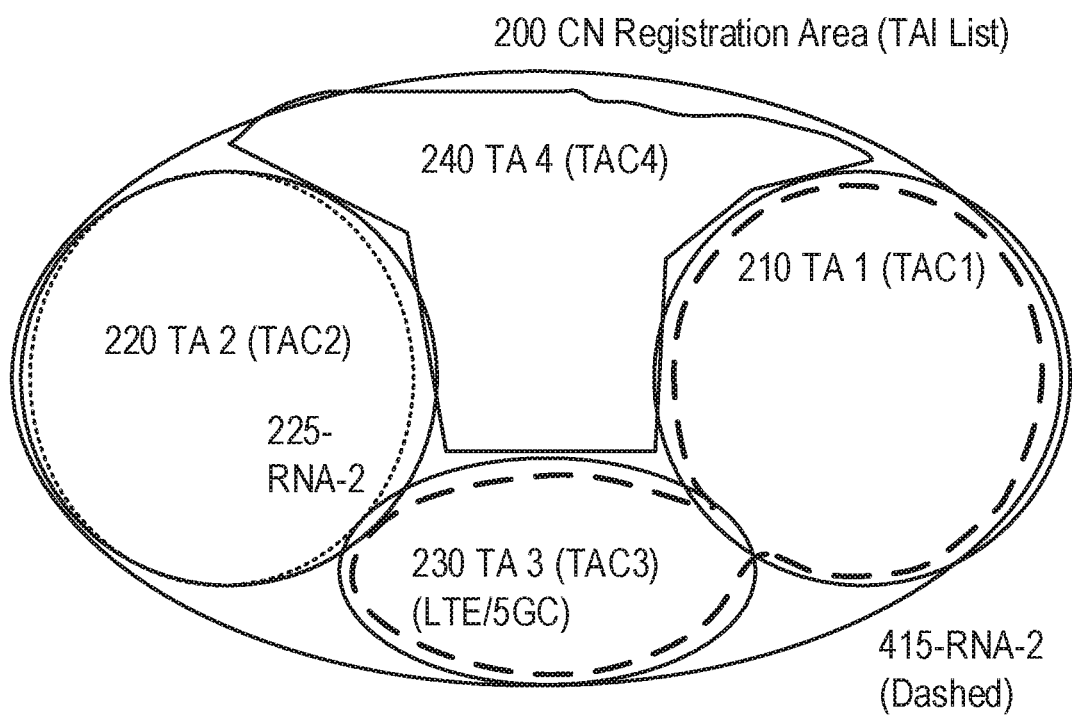
FIG. 13 illustrates an example signaling according to one embodiment of the present invention

FIG. 13 illustrates a situation when the RNA-2 constitutes the complete TA 1 and TA 3. RNA-2 is therefore another type of RNA (as well as RNA-2 illustrated in FIGS. 11 and 12) where the RNA can be defined by RAN Area ID's.

According to one aspect of the present invention, when an RNA is configured that corresponds to RAN Areas, signaling of the RAN areas refers to the signaling of the TAI list.

In the situation according to FIG. 13, complete TA's are part of the RNA.

One way of signaling the complete TA's would be to generate similar information elements as described above for the TAI list.

Since there is a maximum number of TAI's in the TAI list, these TAI's can be indexed. For example, the maximum number of TAI's that can be set as a CN registration area may be 16.

Thus, when signaling the RNA, only a single bitmap with the same length as the maximum number of TAI elements in the TAI list may be formed as shown below.

| 8 | 7 | 6 | 5 | 4 | 3 | 2 | 1 |
|---|---|---|---|---|---|---|---|
| TAI7 |  |  |  | TAI3 | TAI2 | TAI1 | TAI0 |
| TAI15 |  |  |  |  |  |  | TAI8 |

If, like the example illustrated in FIG. 13, the complete TA1 and TA3 are the areas that form the RNA, then these bits are simply set, according to illustration below. In this simple way, with the bitmap, it will be possible to set between 1-15 TA's as RNA, using information corresponding to only two octets.

| 8 | 7 | 6 | 5 | 4 | 3 | 2 | 1 |
|---|---|---|---|---|---|---|---|
| 0 | 0 | 0 | 0 | 1 | 0 | 1 | 0 |
| 0 | 0 | 0 | 0 | 0 | 0 | 0 | 0 |

This bitmap therefore comprises two pointers, pointing to the TAIs TA-2 and TA-4.

In another aspect of the present invention, the RAN Notification Areas are not corresponding to complete TA's, but rather to partial TA's and these are then defined as TAI+RANAC, i.e., the Tracking Area Identity+the RAN Area Code, RANAC that is broadcast in certain cells in a tracking area.

Figure 14:
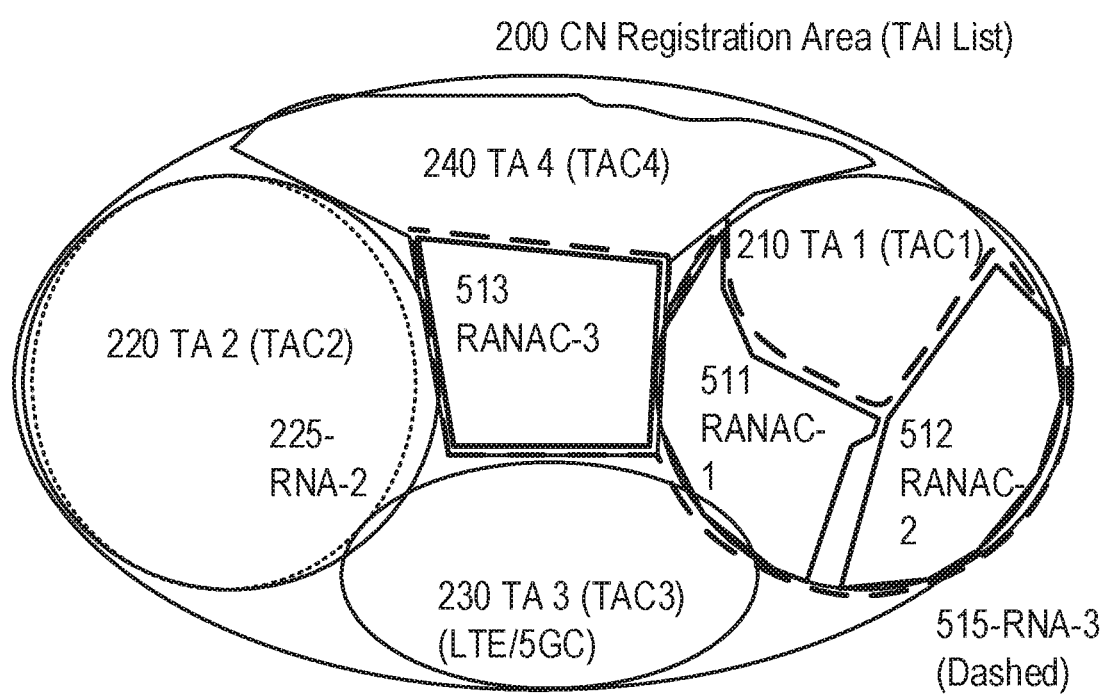
FIG. 14 illustrates example signaling according to an embodiment of the present invention.

An example of how this can look is illustrated in FIG. 14.

FIG. 14 illustrates an RNA that is built up from three different parts in two different TAs.

It should be noted that in the figures described, the abbreviation TAC is used. The reason why this is used is that for each PLMN, a TAC may be broadcast in a cell. The figures thus illustrate the situation in one PLMN, but the CN registration area could also include TAC's that belong to different PLMNs. Hence, the tracking area identity TAI, may be used in the list that communicates the CN Registration area.

RAN Area 1 511 may be defined by broadcast of a RAN Area code RANAC-1 in a set of cells that belong to TA1. RAN Area 2 512 is defined by broadcast of a RAN Area code RANAC-2 in another set of cells, also belonging to TA 1. RAN Area 3 513 on the other hand, is part of another TA, i.e., TA 4, and thus, ain a set of cells in TA 4, the RAN Area Code, RANAC-3 is broadcast.

To signal the RNA of the three different RAN Areas when the RAN Areas are not complete TA's, a bitmap is difficult to use. There is a need to signal both a TAI as well as a RANAC part to properly define the RAN Areas.

According to the example above, the RAN Areas that constitute the RNA are:

TA1-RANAC1
TA1-RANAC2
TA4-RANAC3

According to another aspect of the present invention, when these three RAN Areas are signaled to the UE, the TAI part is signaled using a reference or pointer to an index in the TAI list.

The first PLMN+TAC in the TAI List is indexed 0, the second PLMN+TAC in the TAI list is indexed 1 etc. . . . .

When signaling TA1—corresponding to index 1 (we assume in this example that there also is a TA0 that is not illustrated in the figure), 4 bits are used to provide the index in the TAI list to point out the TA1.

4 bits may enough in the example where the maximum number of different TAIs in the TAI list is 16.

In this example therefore, TAI1 would correspond to "0001", TAI4 would correspond to "0100" etc.

0000=TA0
0001=TA1
0010=TA2
0011=TA3
0100=TA4
0101=TA5
0110=TA6
0111=TA7
1000=TA8
1001=TA9
1010=TA10
1011=TA11

1100=TA12
1101=TA13
1110=TA14
1111=TA15

Using only 4 bits to point out the identity of the TAI considerably saves space in the RRCSuspend, or equivalent control message, which otherwise would need to represents the TAI in a similar way as was described for the TAI-list above, also for the case when simply signaling an RNA. Since the TAI's are already signaled to the UE at the time it is suspended, it is much simpler to just refer to them with an index.

The Index is combined with the RANAC values that are applicable for representing different RANAC's. As there are no RANAC's signaled previously, these may need to be signaled in full. It is believed that the RANACs will be between 6 and 8 bits in size, and thus, signaling a complete RAN Area using the index would take 10-12 bits instead of 22-24 bits. (12 bits are saved using the TAC index instead of the full TAC). In other words, in some examples, the RNA indication further comprises at least one radio access node area code, RANAC, associated with the pointer.

Practically, these savings can be further optimized by listing the relevant TAC's in separate octets and relevant RANACs in other octets. For example, if signaling several RANAC's, assuming each RANAC consumes up to an octet, the TAC's corresponding to the RANACs' can fit two TACs per octet. In other words, the at least one RANAC code may associated with the pointer by a predetermined mapping based on the positioning of the pointer and the at least one RANAC code in the RNC indication.

The message format could then look something like this:

| Number of elements | |
|---|---|
| TAC index 1 | TAC index 2 |
| TAC index 3 | TAC index 4 |
| TAC index 5 | TAC index 6 |
| RANAC1 (together with TAC index 1) | |
| RANAC2 (together with TAC index 2) | |
| RANAC3 (together with TAC index 3) | |
| RANAC4 (together with TAC index 4) | |
| RANAC5 (together with TAC index 5) | |
| RANAC6 (together with TAC index 6) | |

Even though it is said TAC index in the table above, it is in fact the case that the index to the TAI list provide not only the TAC, but in cases when the PLMN's are different, the index also indicate the combination of PLMN+TAC, i.e., it points out what PLMN and TAC that is intended, as this is also part of the TAI list. Thus, strictly speaking, the index is not really pointing towards a TAC, but rather a TAI (PLMN+TAC) and the RNA indication may be:

| Number of elements | |
|---|---|
| TAI index 1 | TAI index 2 |
| TAI index 3 | TAI index 4 |
| TAI index 5 | TAI index 6 |
| RANAC1 (together with TAC index 1) | |
| RANAC2 (together with TAC index 2) | |
| RANAC3 (together with TAC index 3) | |
| RANAC4 (together with TAC index 4) | |
| RANAC5 (together with TAC index 5) | |
| RANAC6 (together with TAC index 6) | |

In this example, the TAI indexes comprise pointers which each point to an element of the TAI list. The indication then further comprises the indication comprises a plurality of radio access network area codes, RANAC, each associated with one of the plurality of pointers. In this example, the associated is made by the positioning of the TAI indexes and RANACs in the RNA indication.

If the PLMN is the same, this will be reflected by the TAI list and thus, will not be necessary to further detail in the index list.

It should be noted that the 4 bit index can be used also to signal only a set of TAI's from the TAI list. This means, that using this method with a list of 4-bit index is also possible in situations when another embodiment of the present invention proposed to use a bitmap. In this situation, it may be necessary to signal, e.g., to indicate a set of TACs/TAIs from the TAI list.

| Number of elements | |
|---|---|
| TAI index 1 | TAI index 2 |
| TAI index 3 | TAI index 4 |
| TAI index 5 | TAI index 6 |

The wireless device receiving the RNA indication may then determine from the RNA indication that one or more cells in the wireless communications network that are both associated with the tracking area identified by the element of the TAI, and associated with RANAC, are part of the RNA.

Figure 15:
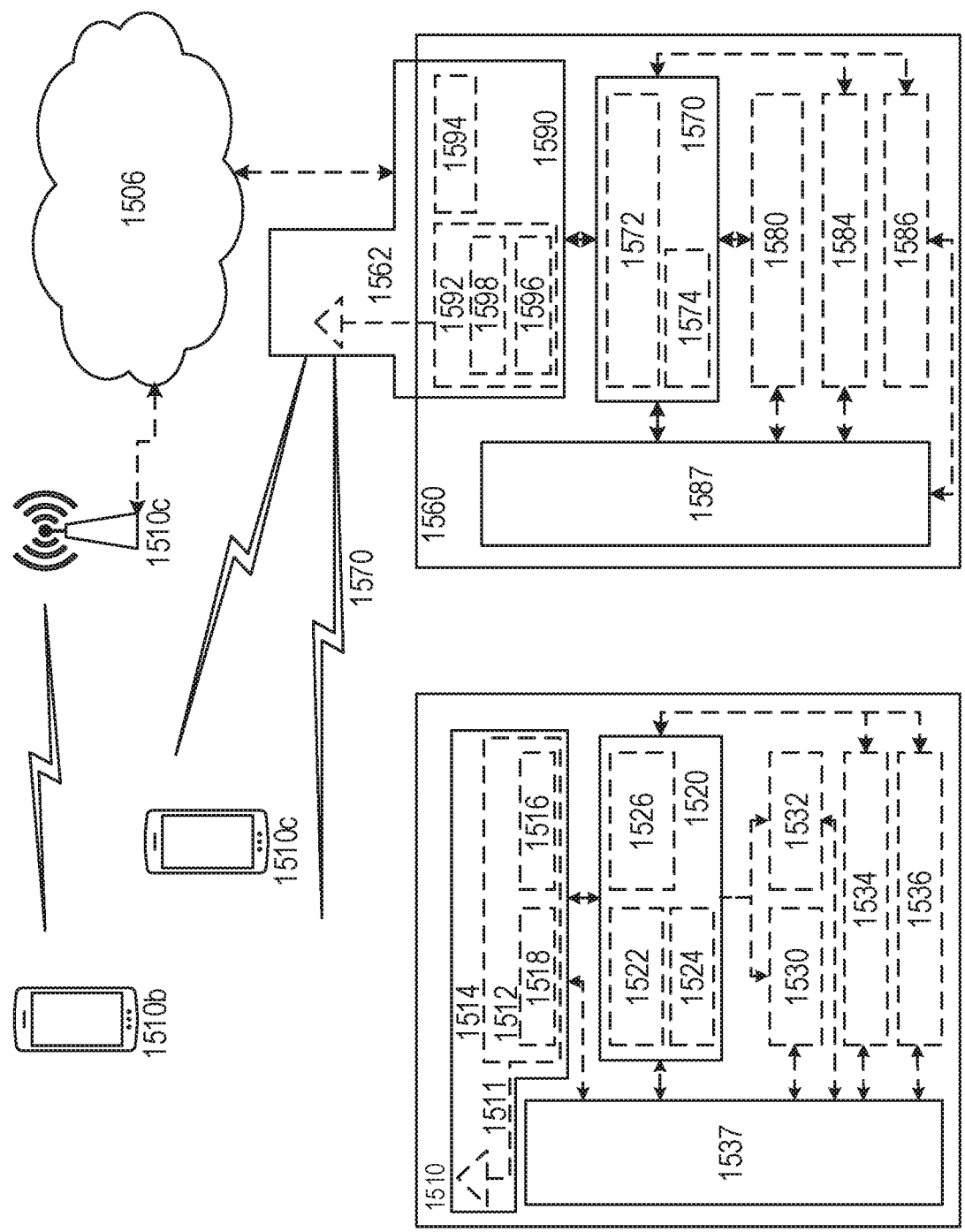
FIG. 15 illustrates a wireless network in accordance with some embodiments.

FIG. 15 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 15. For simplicity, the wireless network of FIG. 15 only depicts network 1506, network nodes 1560 and 1560b, and WDs 1510, 1510b, and 1510c. In practice, a wireless network may further include any additional elements suitable to support communication between wireless devices or between a wireless device and another communication device, such as a landline telephone, a service provider, or any other network node or end device. Of the illustrated components, network node 1560 and wireless device (WD) 1510 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or Zig Bee standards.

Network 1506 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1560 and WD 1510 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

It will be appreciated that the network node 1560 in FIG. 15 may be configured to operate as described above with respect to a base station, gNB or access node, and as described in the numbered embodiments.

In FIG. 15, network node 1560 includes processing circuitry 1570, device readable medium 1580, interface 1590, auxiliary equipment 1584, power source 1586, power circuitry 1587, and antenna 1562. Although network node 1560 illustrated in the example wireless network of FIG. 15 may represent a device that includes the illustrated combination of hardware components, other embodiments may comprise network nodes with different combinations of components.

It is to be understood that a network node comprises any suitable combination of hardware and/or software needed to perform the tasks, features, functions and methods disclosed herein. Moreover, while the components of network node 1560 are depicted as single boxes located within a larger box, or nested within multiple boxes, in practice, a network node may comprise multiple different physical components that make up a single illustrated component (e.g., device readable medium 1580 may comprise multiple separate hard drives as well as multiple RAM modules).

Similarly, network node 1560 may be composed of multiple physically separate components (e.g., a NodeB component and a RNC component, or a BTS component and a BSC component, etc.), which may each have their own respective components. In certain scenarios in which network node 1560 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1560 may be configured to support multiple radio access technologies (RATs). In such embodiments, some components may be duplicated (e.g., separate device readable medium 1580 for the different RATs) and some components may be reused (e.g., the same antenna 1562 may be shared by the RATs). Network node 1560 may also include multiple sets of the various illustrated components for different wireless technologies integrated into network node 1560, such as, for example, GSM, WCDMA, LTE, NR, WiFi, or Bluetooth wireless technologies. These wireless technologies may be integrated into the same or different chip or set of chips and other components within network node 1560.

Processing circuitry 1570 is configured to perform any determining, calculating, or similar operations (e.g., certain obtaining operations) described herein as being provided by a network node. These operations performed by processing circuitry 1570 may include processing information obtained by processing circuitry 1570 by, for example, converting the obtained information into other information, comparing the obtained information or converted information to information stored in the network node, and/or performing one or more operations based on the obtained information or converted information, and as a result of said processing making a determination.

Processing circuitry 1570 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1560 components, such as device readable medium 1580, network node 1560 functionality. For example, processing circuitry 1570 may execute instructions stored in device readable medium 1580 or in memory within processing circuitry 1570. Such functionality may include providing any of the various wireless features, functions, or benefits discussed herein. In some embodiments, processing circuitry 1570 may include a system on a chip (SOC).

In some embodiments, processing circuitry 1570 may include one or more of radio frequency (RF) transceiver circuitry 1572 and baseband processing circuitry 1574. In some embodiments, radio frequency (RF) transceiver circuitry 1572 and baseband processing circuitry 1574 may be on separate chips (or sets of chips), boards, or units, such as radio units and digital units. In alternative embodiments, part or all of RF transceiver circuitry 1572 and baseband processing circuitry 1574 may be on the same chip or set of chips, boards, or units In certain embodiments, some or all of the functionality described herein as being provided by a network node, base station, eNB or other such network device may be performed by processing circuitry 1570 executing instructions stored on device readable medium 1580 or memory within processing circuitry 1570. In alternative embodiments, some or all of the functionality may be provided by processing circuitry 1570 without executing instructions stored on a separate or discrete device readable medium, such as in a hard-wired manner. In any of those embodiments, whether executing instructions stored on a device readable storage medium or not, processing circuitry 1570 can be configured to perform the described functionality. The benefits provided by such functionality are not limited to processing circuitry 1570 alone or to other components of network node 1560, but are enjoyed by network node 1560 as a whole, and/or by end users and the wireless network generally.

Device readable medium 1580 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1570. Device readable medium 1580 may store any suitable instructions, data or information, including a computer program, software, an application including one or more of logic, rules, code, tables, etc. and/or other instructions capable of being executed by processing circuitry 1570 and, utilized by network node 1560. Device readable medium 1580 may be used to store any calculations made by processing circuitry 1570 and/or any data received via interface 1590. In some embodiments, processing circuitry 1570 and device readable medium 1580 may be considered to be integrated.

Interface 1590 is used in the wired or wireless communication of signalling and/or data between network node 1560, network 1506, and/or WDs 1510. As illustrated, interface 1590 comprises port(s)/terminal(s) 1594 to send and receive data, for example to and from network 1506 over a wired connection. Interface 1590 also includes radio front end circuitry 1592 that may be coupled to, or in certain embodiments a part of, antenna 1562. Radio front end circuitry 1592 comprises filters 1598 and amplifiers 1596. Radio front end circuitry 1592 may be connected to antenna 1562 and processing circuitry 1570. Radio front end circuitry may be configured to condition signals communicated between antenna 1562 and processing circuitry 1570. Radio front end circuitry 1592 may receive digital data that is to be sent out to other network nodes or WDs via a wireless connection. Radio front end circuitry 1592 may convert the digital data into a radio signal having the appropriate channel and bandwidth parameters using a combination of filters 1598 and/or amplifiers 1596. The radio signal may then be transmitted via antenna 1562. Similarly, when receiving data, antenna 1562 may collect radio signals which are then converted into digital data by radio front end circuitry 1592. The digital data may be passed to processing circuitry 1570. In other embodiments, the interface may comprise different components and/or different combinations of components.

In certain alternative embodiments, network node 1560 may not include separate radio front end circuitry 1592, instead, processing circuitry 1570 may comprise radio front end circuitry and may be connected to antenna 1562 without separate radio front end circuitry 1592. Similarly, in some embodiments, all or some of RF transceiver circuitry 1572 may be considered a part of interface 1590. In still other embodiments, interface 1590 may include one or more ports or terminals 1594, radio front end circuitry 1592, and RF transceiver circuitry 1572, as part of a radio unit (not shown), and interface 1590 may communicate with baseband processing circuitry 1574, which is part of a digital unit (not shown).

Antenna 1562 may include one or more antennas, or antenna arrays, configured to send and/or receive wireless signals. Antenna 1562 may be coupled to radio front end circuitry 1590 and may be any type of antenna capable of transmitting and receiving data and/or signals wirelessly. In some embodiments, antenna 1562 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1562 may be separate from network node 1560 and may be connectable to network node 1560 through an interface or port.

Antenna 1562, interface 1590, and/or processing circuitry 1570 may be configured to perform any receiving operations and/or certain obtaining operations described herein as being performed by a network node. Any information, data and/or signals may be received from a wireless device, another network node and/or any other network equipment. Similarly, antenna 1562, interface 1590, and/or processing circuitry 1570 may be configured to perform any transmitting operations described herein as being performed by a network node. Any information, data and/or signals may be transmitted to a wireless device, another network node and/or any other network equipment.

Power circuitry 1587 may comprise, or be coupled to, power management circuitry and is configured to supply the components of network node 1560 with power for performing the functionality described herein. Power circuitry 1587 may receive power from power source 1586. Power source 1586 and/or power circuitry 1587 may be configured to provide power to the various components of network node 1560 in a form suitable for the respective components (e.g., at a voltage and current level needed for each respective component). Power source 1586 may either be included in, or external to, power circuitry 1587 and/or network node 1560. For example, network node 1560 may be connectable to an external power source (e.g., an electricity outlet) via an input circuitry or interface such as an electrical cable, whereby the external power source supplies power to power circuitry 1587. As a further example, power source 1586 may comprise a source of power in the form of a battery or battery pack which is connected to, or integrated in, power circuitry 1587. The battery may provide backup power should the external power source fail. Other types of power sources, such as photovoltaic devices, may also be used.

Alternative embodiments of network node 1560 may include additional components beyond those shown in FIG. 15 that may be responsible for providing certain aspects of the network node's functionality, including any of the functionality described herein and/or any functionality necessary to support the subject matter described herein. For example, network node 1560 may include user interface equipment to allow input of information into network node 1560 and to allow output of information from network node 1560. This may allow a user to perform diagnostic, maintenance, repair, and other administrative functions for network node 1560.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

It will be appreciated that wireless device 1510 may be configured to operate as described in the above embodiments with reference to a wireless device or UE. For example as described with reference to the FIGS. 1 to 14, and described in the numbered embodiments.

As illustrated, wireless device 1510 includes antenna 1511, interface 1514, processing circuitry 1520, device readable medium 1530, user interface equipment 1532, auxiliary equipment 1534, power source 1536 and power circuitry 1537. WD 1510 may include multiple sets of one or more of the illustrated components for different wireless technologies supported by WD 1510, such as, for example, GSM, WCDMA, LTE, NR, WiFi, WiMAX, or Bluetooth wireless technologies, just to mention a few. These wireless technologies may be integrated into the same or different chips or set of chips as other components within WD 1510.

Antenna 1511 may include one or more antennas or antenna arrays, configured to send and/or receive wireless signals, and is connected to interface 1514. In certain alternative embodiments, antenna 1511 may be separate from WD 1510 and be connectable to WD 1510 through an interface or port. Antenna 1511, interface 1514, and/or processing circuitry 1520 may be configured to perform any receiving or transmitting operations described herein as being performed by a WD. Any information, data and/or signals may be received from a network node and/or another WD. In some embodiments, radio front end circuitry and/or antenna 1511 may be considered an interface.

As illustrated, interface 1514 comprises radio front end circuitry 1512 and antenna 1511. Radio front end circuitry 1512 comprise one or more filters 1518 and amplifiers 1516. Radio front end circuitry 1514 is connected to antenna 1511 and processing circuitry 1520, and is configured to condition signals communicated between antenna 1511 and processing circuitry 1520. Radio front end circuitry 1512 may be coupled to or a part of antenna 1511. In some embodiments, WD 1510 may not include separate radio front end circuitry 1512; rather, processing circuitry 1520 may comprise radio front end circuitry and may be connected to antenna 1511. Similarly, in some embodiments, some or all of RF transceiver circuitry 1522 may be considered a part of interface 1514. Radio front end circuitry 1512 may receive digital data that is to be sent out to other network nodes or WDs via a wireless connection. Radio front end circuitry 1512 may convert the digital data into a radio signal having the appropriate channel and bandwidth parameters using a combination of filters 1518 and/or amplifiers 1516. The radio signal may then be transmitted via antenna 1511. Similarly, when receiving data, antenna 1511 may collect radio signals which are then converted into digital data by radio front end circuitry 1512. The digital data may be passed to processing circuitry 1520. In other embodiments, the interface may comprise different components and/or different combinations of components.

Processing circuitry 1520 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1510 components, such as device readable medium 1530, WD 1510 functionality. Such functionality may include providing any of the various wireless features or benefits discussed herein. For example, processing circuitry 1520 may execute instructions stored in device readable medium 1530 or in memory within processing circuitry 1520 to provide the functionality disclosed herein.

As illustrated, processing circuitry 1520 includes one or more of RF transceiver circuitry 1522, baseband processing circuitry 1524, and application processing circuitry 1526. In other embodiments, the processing circuitry may comprise different components and/or different combinations of components. In certain embodiments processing circuitry 1520 of WD 1510 may comprise a SOC. In some embodiments, RF transceiver circuitry 1522, baseband processing circuitry 1524, and application processing circuitry 1526 may be on separate chips or sets of chips. In alternative embodiments, part or all of baseband processing circuitry 1524 and application processing circuitry 1526 may be combined into one chip or set of chips, and RF transceiver circuitry 1522 may be on a separate chip or set of chips. In still alternative embodiments, part or all of RF transceiver circuitry 1522 and baseband processing circuitry 1524 may be on the same chip or set of chips, and application processing circuitry 1526 may be on a separate chip or set of chips. In yet other alternative embodiments, part or all of RF transceiver circuitry 1522, baseband processing circuitry 1524, and application processing circuitry 1526 may be combined in the same chip or set of chips. In some embodiments, RF transceiver circuitry 1522 may be a part of interface 1514. RF transceiver circuitry 1522 may condition RF signals for processing circuitry 1520.

In certain embodiments, some or all of the functionality described herein as being performed by a WD may be provided by processing circuitry 1520 executing instructions stored on device readable medium 1530, which in certain embodiments may be a computer-readable storage medium. In alternative embodiments, some or all of the functionality may be provided by processing circuitry 1520 without executing instructions stored on a separate or discrete device readable storage medium, such as in a hard-wired manner. In any of those particular embodiments, whether executing instructions stored on a device readable storage medium or not, processing circuitry 1520 can be configured to perform the described functionality. The benefits provided by such functionality are not limited to processing circuitry 1520 alone or to other components of WD 1510, but are enjoyed by WD 1510 as a whole, and/or by end users and the wireless network generally.

Processing circuitry 1520 may be configured to perform any determining, calculating, or similar operations (e.g., certain obtaining operations) described herein as being performed by a WD. These operations, as performed by processing circuitry 1520, may include processing information obtained by processing circuitry 1520 by, for example, converting the obtained information into other information, comparing the obtained information or converted information to information stored by WD 1510, and/or performing one or more operations based on the obtained information or converted information, and as a result of said processing making a determination.

Device readable medium 1530 may be operable to store a computer program, software, an application including one or more of logic, rules, code, tables, etc. and/or other instructions capable of being executed by processing circuitry 1520. Device readable medium 1530 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1520. In some embodiments, processing circuitry 1520 and device readable medium 1530 may be considered to be integrated.

User interface equipment 1532 may provide components that allow for a human user to interact with WD 1510. Such interaction may be of many forms, such as visual, audial, tactile, etc. User interface equipment 1532 may be operable to produce output to the user and to allow the user to provide input to WD 1510. The type of interaction may vary depending on the type of user interface equipment 1532 installed in WD 1510. For example, if WD 1510 is a smart phone, the interaction may be via a touch screen; if WD 1510 is a smart meter, the interaction may be through a screen that provides usage (e.g., the number of gallons used) or a speaker that provides an audible alert (e.g., if smoke is detected). User interface equipment 1532 may include input interfaces, devices and circuits, and output interfaces, devices and circuits. User interface equipment 1532 is configured to allow input of information into WD 1510, and is connected to processing circuitry 1520 to allow processing circuitry 1520 to process the input information. User interface equipment 1532 may include, for example, a microphone, a proximity or other sensor, keys/buttons, a touch display, one or more cameras, a USB port, or other input circuitry. User interface equipment 1532 is also configured to allow output of information from WD 1510, and to allow processing circuitry 1520 to output information from WD 1510. User interface equipment 1532 may include, for example, a speaker, a display, vibrating circuitry, a USB port, a headphone interface, or other output circuitry. Using one or more input and output interfaces, devices, and circuits, of user interface equipment 1532, WD 1510 may communicate with end users and/or the wireless network, and allow them to benefit from the functionality described herein.

Auxiliary equipment 1534 is operable to provide more specific functionality which may not be generally performed by WDs. This may comprise specialized sensors for doing measurements for various purposes, interfaces for additional types of communication such as wired communications etc. The inclusion and type of components of auxiliary equipment 1534 may vary depending on the embodiment and/or scenario.

Power source 1536 may, in some embodiments, be in the form of a battery or battery pack. Other types of power sources, such as an external power source (e.g., an electricity outlet), photovoltaic devices or power cells, may also be used. WD 1510 may further comprise power circuitry 1537 for delivering power from power source 1536 to the various parts of WD 1510 which need power from power source 1536 to carry out any functionality described or indicated herein. Power circuitry 1537 may in certain embodiments comprise power management circuitry. Power circuitry 1537 may additionally or alternatively be operable to receive power from an external power source; in which case WD 1510 may be connectable to the external power source (such as an electricity outlet) via input circuitry or an interface such as an electrical power cable. Power circuitry 1537 may also in certain embodiments be operable to deliver power from an external power source to power source 1536. This may be, for example, for the charging of power source 1536. Power circuitry 1537 may perform any formatting, converting, or other modification to the power from power source 1536 to make the power suitable for the respective components of WD 1510 to which power is supplied.

Figure 16:
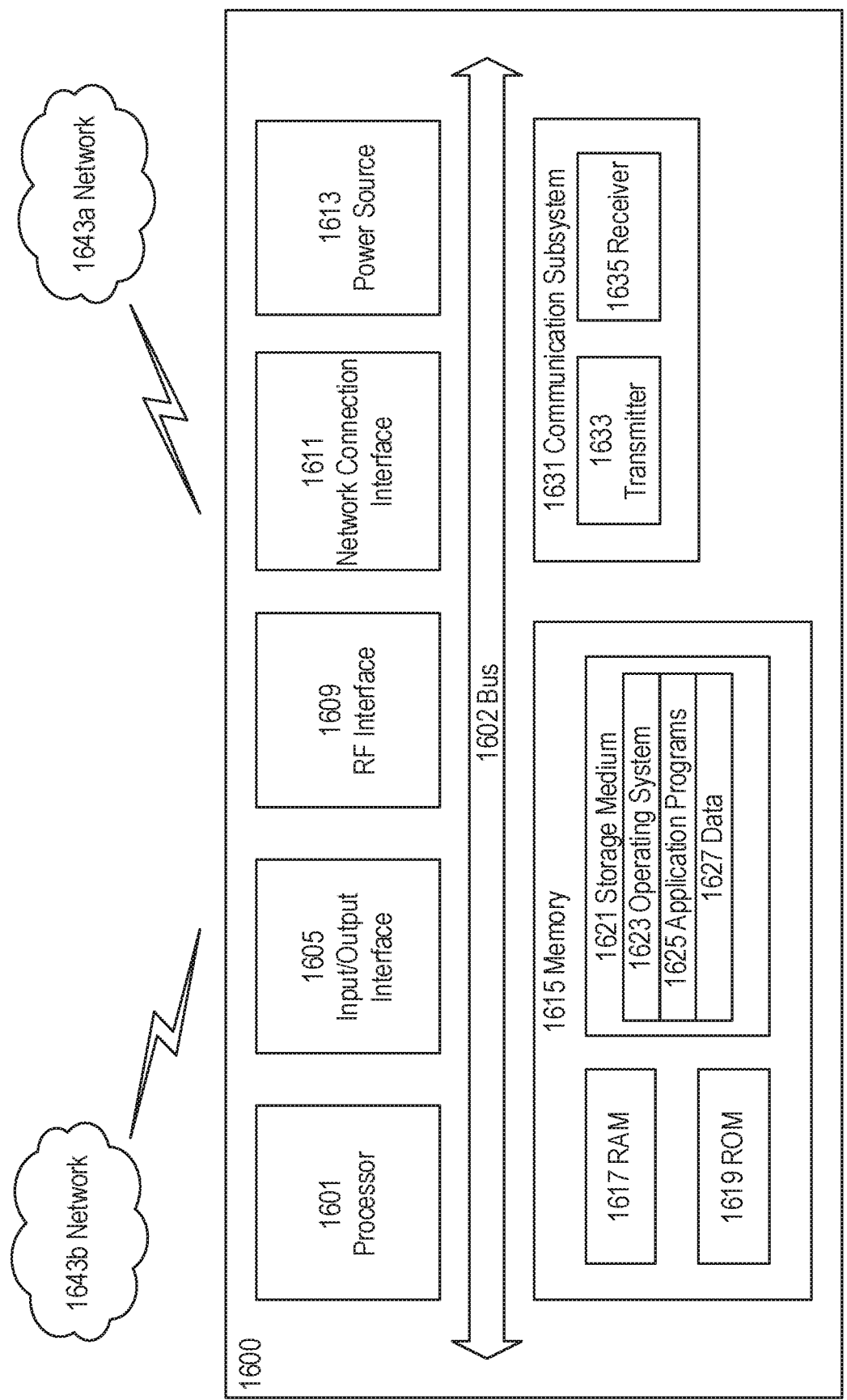
FIG. 16 illustrates a User Equipment in accordance with some embodiments.

FIG. 16 illustrates a User Equipment in accordance with some embodiments.

FIG. 16 illustrates one embodiment of a UE in accordance with various aspects described herein. It will be appreciated that the UE 16200 may be configured as described with reference to a wireless device as described in the above embodiments. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 16200 may be any UE identified by the 3$^{rd}$ Generation Partnership Project (3GPP), including a NB-IoT UE, a machine type communication (MTC) UE, and/or an enhanced MTC (eMTC) UE. UE 1600, as illustrated in FIG. 16, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE may be used interchangeable. Accordingly, although FIG. 16 is a UE, the components discussed herein are equally applicable to a WD, and vice-versa.

In FIG. 16, UE 1600 includes processing circuitry 1601 that is operatively coupled to input/output interface 1605, radio frequency (RF) interface 1609, network connection interface 1611, memory 1615 including random access memory (RAM) 1617, read-only memory (ROM) 1619, and storage medium 1621 or the like, communication subsystem 1631, power source 1633, and/or any other component, or any combination thereof. Storage medium 1621 includes operating system 1623, application program 1625, and data 1627. In other embodiments, storage medium 1621 may include other similar types of information. Certain UEs may utilize all of the components shown in FIG. 16, or only a subset of the components. The level of integration between the components may vary from one UE to another UE. Further, certain UEs may contain multiple instances of a component, such as multiple processors, memories, transceivers, transmitters, receivers, etc.

In FIG. 16, processing circuitry 1601 may be configured to process computer instructions and data. Processing circuitry 1601 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1601 may include two central processing units (CPUs). Data may be information in a form suitable for use by a computer.

In the depicted embodiment, input/output interface 1605 may be configured to provide a communication interface to an input device, output device, or input and output device. UE 1600 may be configured to use an output device via input/output interface 1605. An output device may use the same type of interface port as an input device. For example, a USB port may be used to provide input to and output from UE 1600. The output device may be a speaker, a sound card, a video card, a display, a monitor, a printer, an actuator, an emitter, a smartcard, another output device, or any combination thereof. UE 1600 may be configured to use an input device via input/output interface 1605 to allow a user to capture information into UE 1600. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 16, RF interface 1609 may be configured to provide a communication interface to RF components such as a transmitter, a receiver, and an antenna. Network connection interface 1611 may be configured to provide a communication interface to network 1643a. Network 1643a may encompass wired and/or wireless networks such as a local-area network (LAN), a wide-area network (WAN), a computer network, a wireless network, a telecommunications network, another like network or any combination thereof. For example, network 1643a may comprise a Wi-Fi network. Network connection interface 1611 may be configured to include a receiver and a transmitter interface used to communicate with one or more other devices over a communication network according to one or more communication protocols, such as Ethernet, TCP/IP, SONET, ATM, or the like. Network connection interface 1611 may implement receiver and transmitter functionality appropriate to the communication network links (e.g., optical, electrical, and the like). The transmitter and receiver functions may share circuit components, software or firmware, or alternatively may be implemented separately.

RAM 1617 may be configured to interface via bus 1602 to processing circuitry 1601 to provide storage or caching of data or computer instructions during the execution of software programs such as the operating system, application programs, and device drivers. ROM 1619 may be configured to provide computer instructions or data to processing circuitry 1601. For example, ROM 1619 may be configured to store invariant low-level system code or data for basic system functions such as basic input and output (I/O), startup, or reception of keystrokes from a keyboard that are stored in a non-volatile memory. Storage medium 1621 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1621 may be configured to include operating system 1623, application program 1625 such as a web browser application, a widget or gadget engine or another application, and data file 1627. Storage medium 1621 may store, for use by UE 1600, any of a variety of various operating systems or combinations of operating systems.

Storage medium 1621 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1621 may allow UE 1600 to access computer-executable instructions, application programs or the like, stored on transitory or non-transitory memory media, to off-load data, or to upload data. An article of manufacture, such as one utilizing a communication system may be tangibly embodied in storage medium 1621, which may comprise a device readable medium.

In FIG. 16, processing circuitry 1601 may be configured to communicate with network 1643b using communication subsystem 1631. Network 1643a and network 1643b may be the same network or networks or different network or networks. Communication subsystem 1631 may be configured to include one or more transceivers used to communicate with network 1643b. For example, communication subsystem 1631 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 1633 and/or receiver 1635 to implement transmitter or receiver functionality, respectively, appropriate to the RAN links (e.g., frequency allocations and the like). Further, transmitter 1633 and receiver 1635 of each transceiver may share circuit components, software or firmware, or alternatively may be implemented separately.

In the illustrated embodiment, the communication functions of communication subsystem 1631 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1631 may include cellular communication, Wi-Fi communication, Bluetooth communication, and GPS communication. Network 1643b may encompass wired and/or wireless networks such as a local-area network (LAN), a wide-area network (WAN), a computer network, a wireless network, a telecommunications network, another like network or any combination thereof. For example, network 1643b may be a cellular network, a Wi-Fi network, and/or a near-field network. Power source 1613 may be configured to provide alternating current (AC) or direct current (DC) power to components of UE 1600.

The features, benefits and/or functions described herein may be implemented in one of the components of UE 1600 or partitioned across multiple components of UE 1600. Further, the features, benefits, and/or functions described herein may be implemented in any combination of hardware, software or firmware. In one example, communication subsystem 1631 may be configured to include any of the components described herein. Further, processing circuitry 1601 may be configured to communicate with any of such components over bus 1602. In another example, any of such components may be represented by program instructions stored in memory that when executed by processing circuitry 1601 perform the corresponding functions described herein. In another example, the functionality of any of such components may be partitioned between processing circuitry 1601 and communication subsystem 1631. In another example, the non-computationally intensive functions of any of such components may be implemented in software or firmware and the computationally intensive functions may be implemented in hardware.

Figure 17:
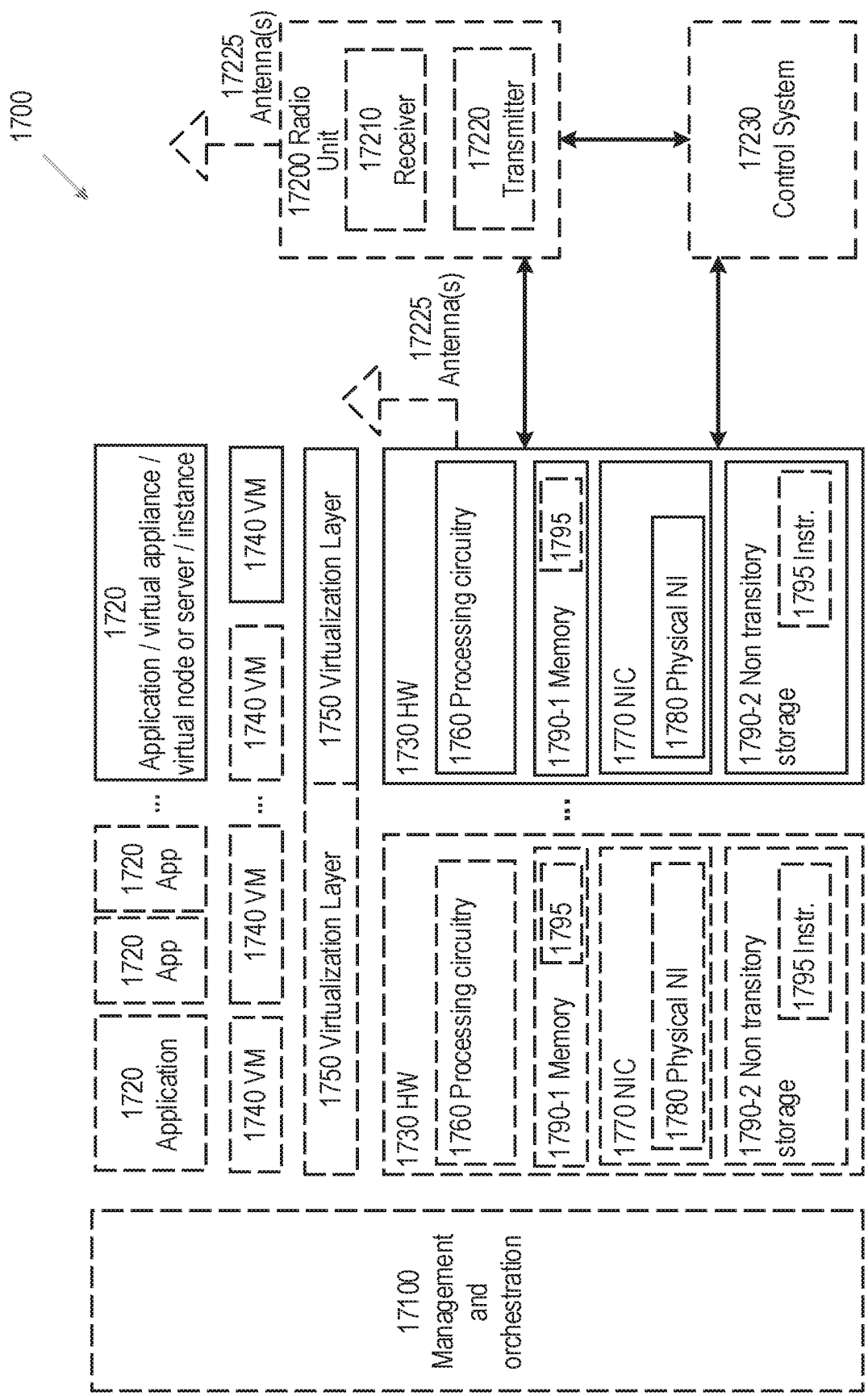
FIG. 17 illustrates a virtualization environment in accordance with some embodiments.

FIG. 17 illustrates a virtualization environment in accordance with some embodiments.

FIG. 17 is a schematic block diagram illustrating a virtualization environment 1700 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1700 hosted by one or more of hardware nodes 1730. Further, in embodiments in which the virtual node is not a radio access node or does not require radio connectivity (e.g., a core network node), then the network node may be entirely virtualized.

The functions may be implemented by one or more applications 1720 (which may alternatively be called software instances, virtual appliances, network functions, virtual nodes, virtual network functions, etc.) operative to implement some of the features, functions, and/or benefits of some of the embodiments disclosed herein. Applications 1720 are run in virtualization environment 1700 which provides hardware 1730 comprising processing circuitry 1760 and memory 1790. Memory 1790 contains instructions 1795 executable by processing circuitry 1760 whereby application 1720 is operative to provide one or more of the features, benefits, and/or functions disclosed herein.

Virtualization environment 1700, comprises general-purpose or special-purpose network hardware devices 1730 comprising a set of one or more processors or processing circuitry 1760, which may be commercial off-the-shelf (COTS) processors, dedicated Application Specific Integrated Circuits (ASICs), or any other type of processing circuitry including digital or analog hardware components or special purpose processors. Each hardware device may comprise memory 1790-1 which may be non-persistent memory for temporarily storing instructions 1795 or software executed by processing circuitry 1760. Each hardware device may comprise one or more network interface controllers (NICs) 1770, also known as network interface cards, which include physical network interface 1780. Each hardware device may also include non-transitory, persistent, machine-readable storage media 1790-2 having stored therein software 1795 and/or instructions executable by processing circuitry 1760. Software 1795 may include any type of software including software for instantiating one or more virtualization layers 1750 (also referred to as hypervisors), software to execute virtual machines 1740 as well as software allowing it to execute functions, features and/or benefits described in relation with some embodiments described herein.

Virtual machines 1740, comprise virtual processing, virtual memory, virtual networking or interface and virtual storage, and may be run by a corresponding virtualization layer 1750 or hypervisor. Different embodiments of the instance of virtual appliance 1720 may be implemented on one or more of virtual machines 1740, and the implementations may be made in different ways.

During operation, processing circuitry 1760 executes software 1795 to instantiate the hypervisor or virtualization layer 1750, which may sometimes be referred to as a virtual machine monitor (VMM). Virtualization layer 1750 may present a virtual operating platform that appears like networking hardware to virtual machine 1740.

As shown in FIG. 17, hardware 1730 may be a standalone network node with generic or specific components. Hardware 1730 may comprise antenna 17225 and may implement some functions via virtualization. Alternatively, hardware 1730 may be part of a larger cluster of hardware (e.g. such as in a data center or customer premise equipment (CPE)) where many hardware nodes work together and are managed via management and orchestration (MANO) 17100, which, among others, oversees lifecycle management of applications 1720.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1740 may be a software implementation of a physical machine that runs programs as if they were executing on a physical, non-virtualized machine. Each of virtual machines 1740, and that part of hardware 1730 that executes that virtual machine, be it hardware dedicated to that virtual machine and/or hardware shared by that virtual machine with others of the virtual machines 1740, forms a separate virtual network elements (VNE).

Still in the context of NFV, Virtual Network Function (VNF) is responsible for handling specific network functions that run in one or more virtual machines 1740 on top of hardware networking infrastructure 1730 and corresponds to application 1720 in FIG. 17.

In some embodiments, one or more radio units 17200 that each include one or more transmitters 17220 and one or more receivers 17210 may be coupled to one or more antennas 17225. Radio units 17200 may communicate directly with hardware nodes 1730 via one or more appropriate network interfaces and may be used in combination with the virtual components to provide a virtual node with radio capabilities, such as a radio access node or a base station.

In some embodiments, some signalling can be effected with the use of control system 17230 which may alternatively be used for communication between the hardware nodes 1730 and radio units 17200.

Figure 18:
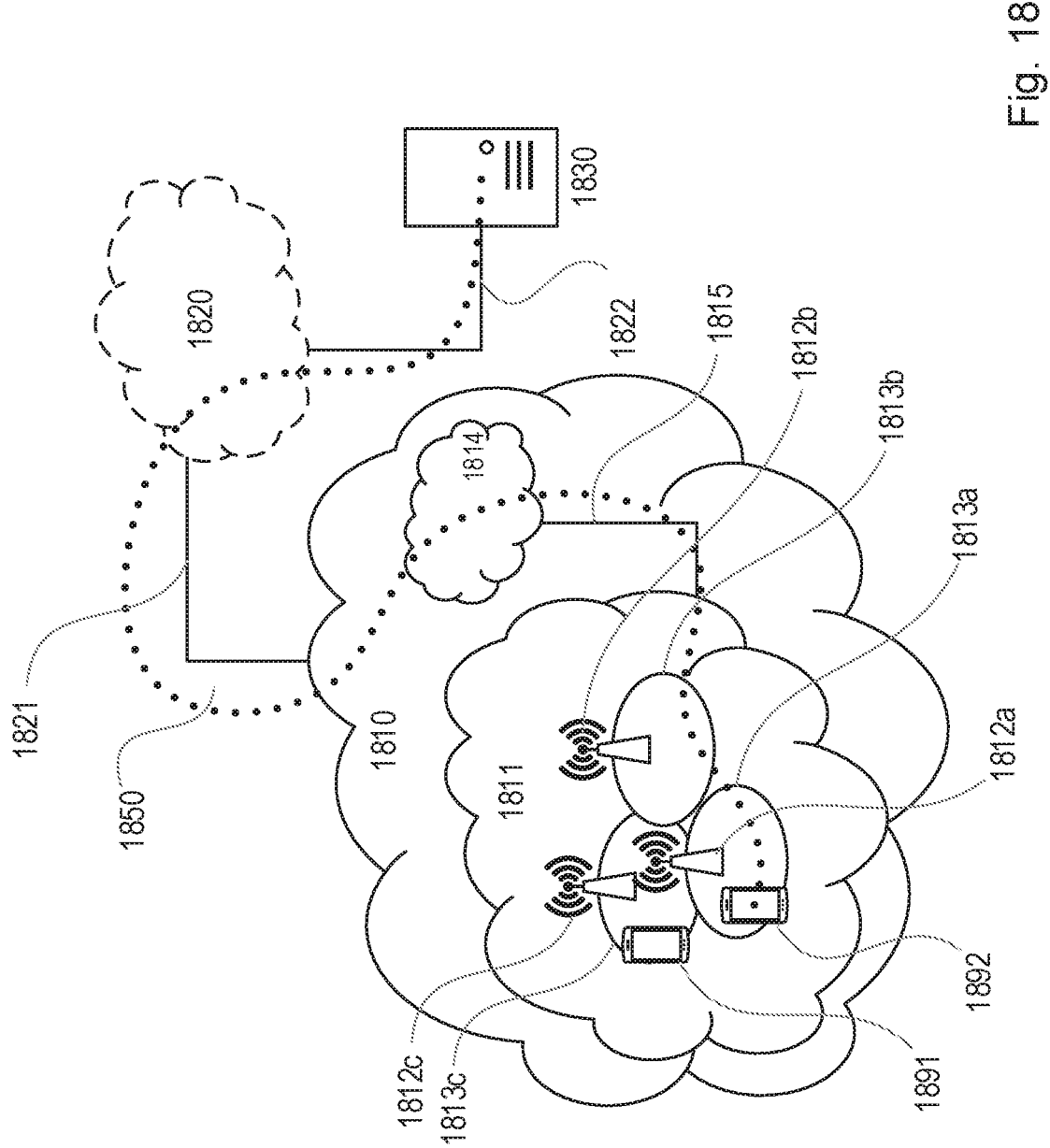
FIG. 18 illustrates a telecommunication network connected via an intermediate network to a host computer in accordance with some embodiments.

FIG. 18 illustrates a telecommunication network connected via an intermediate network to a host computer in accordance with some embodiments.

With reference to FIG. 18, in accordance with an embodiment, a communication system includes telecommunication network 1810, such as a 3GPP-type cellular network, which comprises access network 1811, such as a radio access network, and core network 1814. Access network 1811 comprises a plurality of base stations 1812*a*, 1812*b*, 1812*c*, such as NBs, eNBs, gNBs or other types of wireless access points, each defining a corresponding coverage area 1813*a*, 1813*b*, 1813*c*. Each base station 1812*a*, 1812*b*, 1812*c* is connectable to core network 1814 over a wired or wireless connection 1815. A first UE 1891 located in coverage area 1813*c* is configured to wirelessly connect to, or be paged by, the corresponding base station 1812*c*. A second UE 1892 in coverage area 1813*a* is wirelessly connectable to the corresponding base station 1812*a*. While a plurality of UEs 1891, 1892 are illustrated in this example, the disclosed embodiments are equally applicable to a situation where a sole UE is in the coverage area or where a sole UE is connecting to the corresponding base station 1812.

The base stations and UEs in this figure may be configured to operate as described in all embodiments above, including as described in the numbered embodiments below.

Telecommunication network 1810 is itself connected to host computer 1830, which may be embodied in the hardware and/or software of a standalone server, a cloud-implemented server, a distributed server or as processing resources in a server farm. Host computer 1830 may be under the ownership or control of a service provider, or may be operated by the service provider or on behalf of the service provider. Connections 1821 and 1822 between telecommunication network 1810 and host computer 1830 may extend directly from core network 1814 to host computer 1830 or may go via an optional intermediate network 1820. Intermediate network 1820 may be one of, or a combination of more than one of, a public, private or hosted network; intermediate network 1820, if any, may be a backbone network or the Internet; in particular, intermediate network 1820 may comprise two or more sub-networks (not shown).

The communication system of FIG. 18 as a whole enables connectivity between the connected UEs 1891, 1892 and host computer 1830. The connectivity may be described as an over-the-top (OTT) connection 1850. Host computer 1830 and the connected UEs 1891, 1892 are configured to communicate data and/or signaling via OTT connection 1850, using access network 1811, core network 1814, any intermediate network 1820 and possible further infrastructure (not shown) as intermediaries. OTT connection 1850 may be transparent in the sense that the participating communication devices through which OTT connection 1850 passes are unaware of routing of uplink and downlink communications. For example, base station 1812 may not or need not be informed about the past routing of an incoming downlink communication with data originating from host computer 1830 to be forwarded (e.g., handed over) to a connected UE 1891. Similarly, base station 1812 need not be aware of the future routing of an outgoing uplink communication originating from the UE 1891 towards the host computer 1830.

Figure 19:
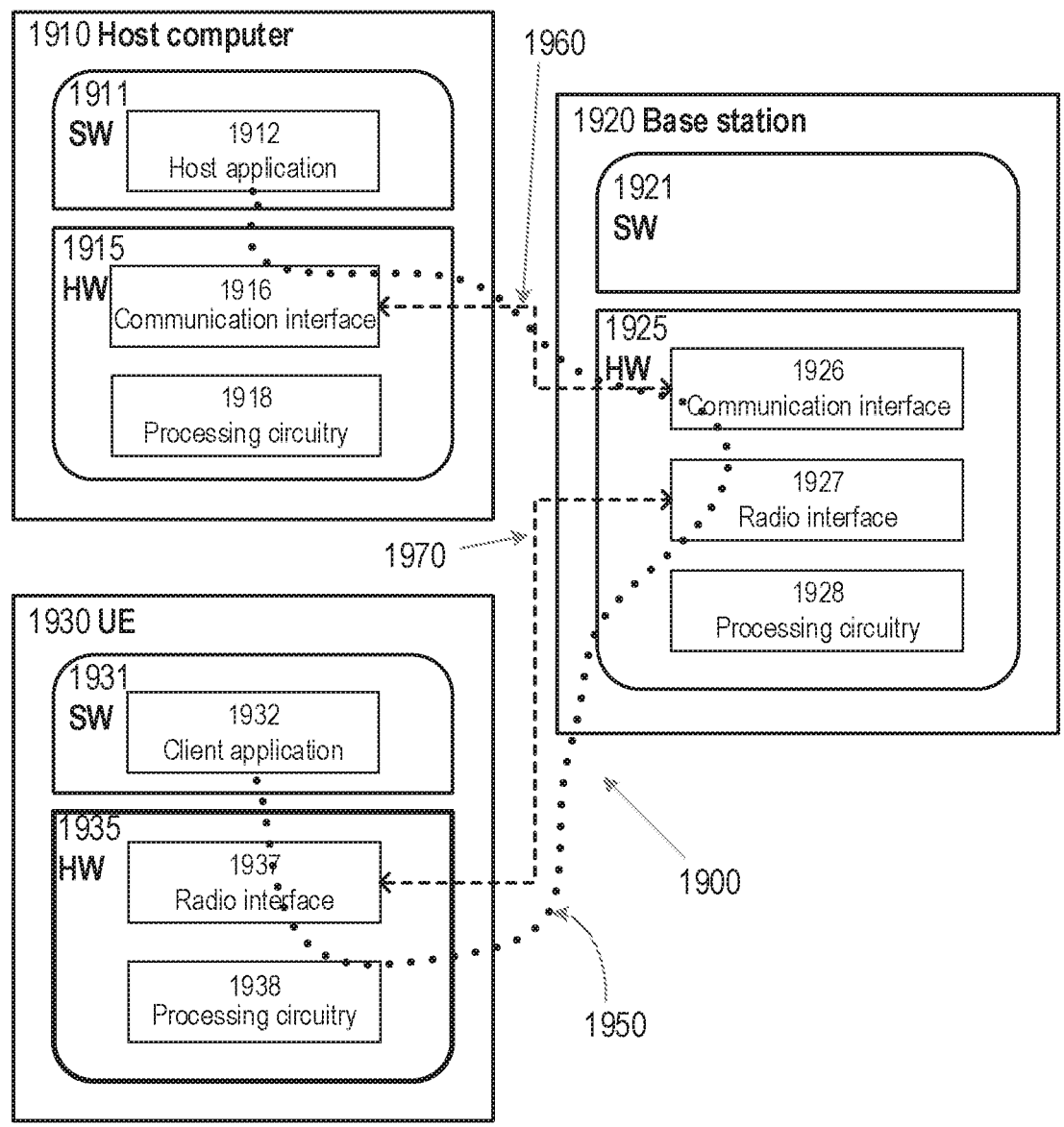
FIG. 19 illustrates host computer communicating via a base station with a user equipment over a partially wireless connection in accordance with some embodiments.

FIG. 19 illustrates host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 19. In communication system 1900, host computer 1910 comprises hardware 1915 including communication interface 1916 configured to set up and maintain a wired or wireless connection with an interface of a different communication device of communication system 1900. Host computer 1910 further comprises processing circuitry 1918, which may have storage and/or processing capabilities. In particular, processing circuitry 1918 may comprise one or more programmable processors, application-specific integrated circuits, field programmable gate arrays or combinations of these (not shown) adapted to execute instructions. Host computer 1910 further comprises software 1911, which is stored in or accessible by host computer 1910 and executable by processing circuitry 1918.

Software 1911 includes host application 1912. Host application 1912 may be operable to provide a service to a remote user, such as UE 1930 connecting via OTT connection 1950 terminating at UE 1930 and host computer 1910. In providing the service to the remote user, host application 1912 may provide user data which is transmitted using OTT connection 1950.

Communication system 1900 further includes base station 1920 provided in a telecommunication system and comprising hardware 1925 enabling it to communicate with host computer 1910 and with UE 1930. Hardware 1925 may include communication interface 1926 for setting up and maintaining a wired or wireless connection with an interface of a different communication device of communication system 1900, as well as radio interface 1927 for setting up and maintaining at least wireless connection 1970 with UE 1930 located in a coverage area (not shown in FIG. 19) served by base station 1920. Communication interface 1926 may be configured to facilitate connection 1960 to host computer 1910. Connection 1960 may be direct or it may pass through a core network (not shown in FIG. 19) of the telecommunication system and/or through one or more intermediate networks outside the telecommunication system. In the embodiment shown, hardware 1925 of base station 1920 further includes processing circuitry 1928, which may comprise one or more programmable processors, application-specific integrated circuits, field programmable gate arrays or combinations of these (not shown) adapted to execute instructions. Base station 1920 further has software 1921 stored internally or accessible via an external connection.

Communication system 1900 further includes UE 1930 already referred to. Its hardware 1935 may include radio interface 1937 configured to set up and maintain wireless connection 1970 with a base station serving a coverage area in which UE 1930 is currently located. Hardware 1935 of UE 1930 further includes processing circuitry 1938, which may comprise one or more programmable processors, application-specific integrated circuits, field programmable gate arrays or combinations of these (not shown) adapted to execute instructions. UE 1930 further comprises software 1931, which is stored in or accessible by UE 1930 and executable by processing circuitry 1938. Software 1931 includes client application 1932. Client application 1932 may be operable to provide a service to a human or non-human user via UE 1930, with the support of host computer 1910. In host computer 1910, an executing host application 1912 may communicate with the executing client application 1932 via OTT connection 1950 terminating at UE 1930 and host computer 1910. In providing the service to the user, client application 1932 may receive request data from host application 1912 and provide user data in response to the request data. OTT connection 1950 may transfer both the request data and the user data. Client application 1932 may interact with the user to generate the user data that it provides.

It is noted that host computer 1910, base station 1920 and UE 1930 illustrated in FIG. 19 may be similar or identical to host computer 1830, one of base stations 1812a, 1812b, 1812c and one of UEs 1891, 1892 of FIG. 18, respectively. This is to say, the inner workings of these entities may be as shown in FIG. 19 and independently, the surrounding network topology may be that of FIG. 18.

In FIG. 19, OTT connection 1950 has been drawn abstractly to illustrate the communication between host computer 1910 and UE 1930 via base station 1920, without explicit reference to any intermediary devices and the precise routing of messages via these devices. Network infrastructure may determine the routing, which it may be configured to hide from UE 1930 or from the service provider operating host computer 1910, or both. While OTT connection 1950 is active, the network infrastructure may further take decisions by which it dynamically changes the routing (e.g., on the basis of load balancing consideration or reconfiguration of the network).

Wireless connection 1970 between UE 1930 and base station 1920 is in accordance with the teachings of the embodiments described throughout this disclosure. One or more of the various embodiments improve the performance of OTT services provided to UE 1930 using OTT connection 1950, in which wireless connection 1970 forms the last segment. More precisely, the teachings of these embodiments may improve the amount data required to indicate a RNA to a wireless device and thereby provide benefits such as reducing the overhead in signaling to the wireless device.

A measurement procedure may be provided for the purpose of monitoring data rate, latency and other factors on which the one or more embodiments improve. There may further be an optional network functionality for reconfiguring OTT connection 1950 between host computer 1910 and UE 1930, in response to variations in the measurement results. The measurement procedure and/or the network functionality for reconfiguring OTT connection 1950 may be implemented in software 1911 and hardware 1915 of host computer 1910 or in software 1931 and hardware 1935 of UE 1930, or both. In embodiments, sensors (not shown) may be deployed in or in association with communication devices through which OTT connection 1950 passes; the sensors may participate in the measurement procedure by supplying values of the monitored quantities exemplified above, or supplying values of other physical quantities from which software 1911, 1931 may compute or estimate the monitored quantities. The reconfiguring of OTT connection 1950 may include message format, retransmission settings, preferred routing etc.; the reconfiguring need not affect base station 1920, and it may be unknown or imperceptible to base station 1920. Such procedures and functionalities may be known and practiced in the art. In certain embodiments, measurements may involve proprietary UE signaling facilitating host computer 1910's measurements of throughput, propagation times, latency and the like. The measurements may be implemented in that software 1911 and 1931 causes messages to be transmitted, in particular empty or 'dummy' messages, using OTT connection 1950 while it monitors propagation times, errors etc.

Figure 20:
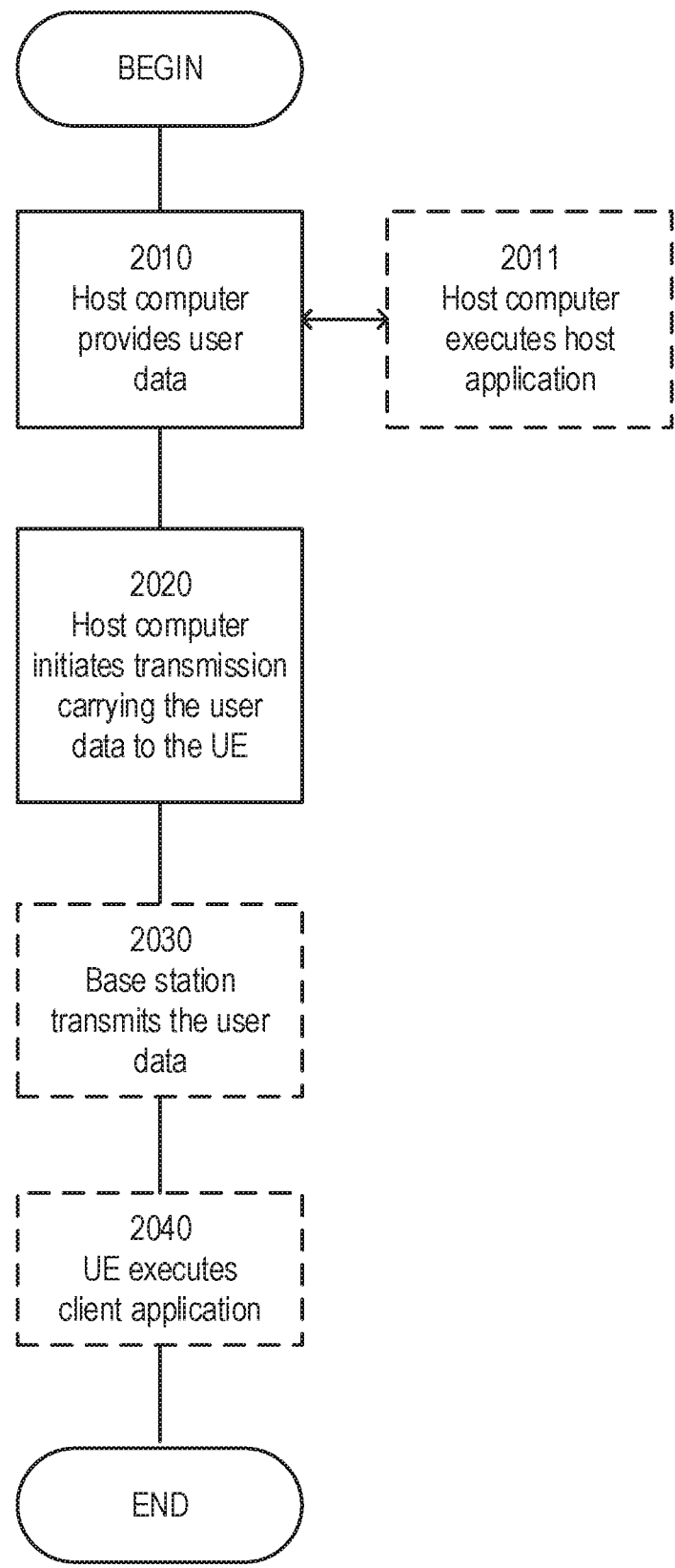
FIG. 20 illustrates methods implemented in a communication system including a host computer, a base station and a user equipment in accordance with some embodiments.

FIG. 20 illustrates methods implemented in a communication system including a host computer, a base station and a user equipment in accordance with some embodiments.

FIG. 20 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 20 will be included in this section. In step 2010, the host computer provides user data. In substep 2011 (which may be optional) of step 2010, the host computer provides the user data by executing a host application. In step 2020, the host computer initiates a transmission carrying the user data to the UE. In step 2030 (which may be optional), the base station transmits to the UE the user data which was carried in the transmission that the host computer initiated, in accordance with the teachings of the embodiments described throughout this disclosure. In step 2040 (which may also be optional), the UE executes a client application associated with the host application executed by the host computer.

Figure 21:
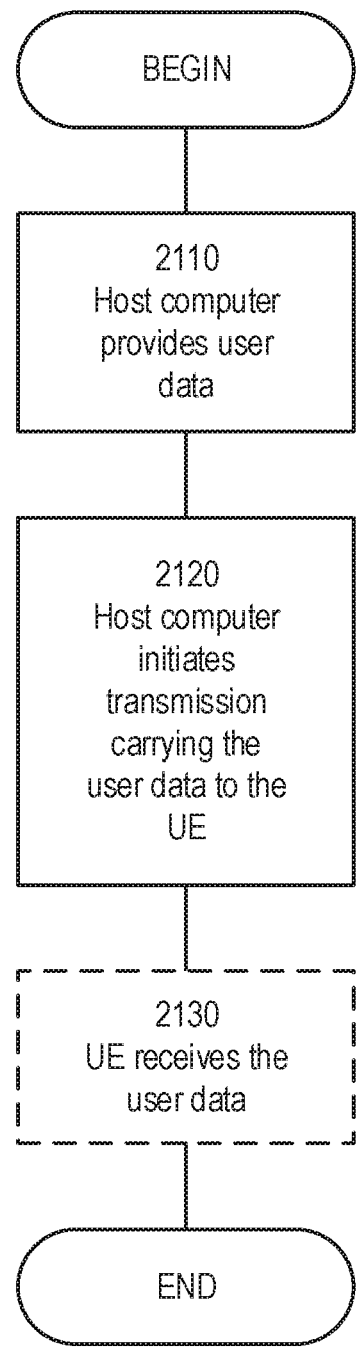
FIG. 21 illustrates methods implemented in a communication system including a host computer, a base station and a user equipment in accordance with some embodiments.

FIG. 21 illustrates methods implemented in a communication system including a host computer, a base station and a user equipment in accordance with some embodiments.

FIG. 21 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 21 will be included in this section. In step 2110 of the method, the host computer provides user data. In an optional substep (not shown) the host computer provides the user data by executing a host application. In step 2120, the host computer initiates a transmission carrying the user data to the UE. The transmission may pass via the base station, in accordance with the teachings of the embodiments described throughout this disclosure. In step 2130 (which may be optional), the UE receives the user data carried in the transmission FIG. 22 illustrates methods implemented in a communication system including a host computer, a base station and a user equipment in accordance with some embodiments.

Figure 22:
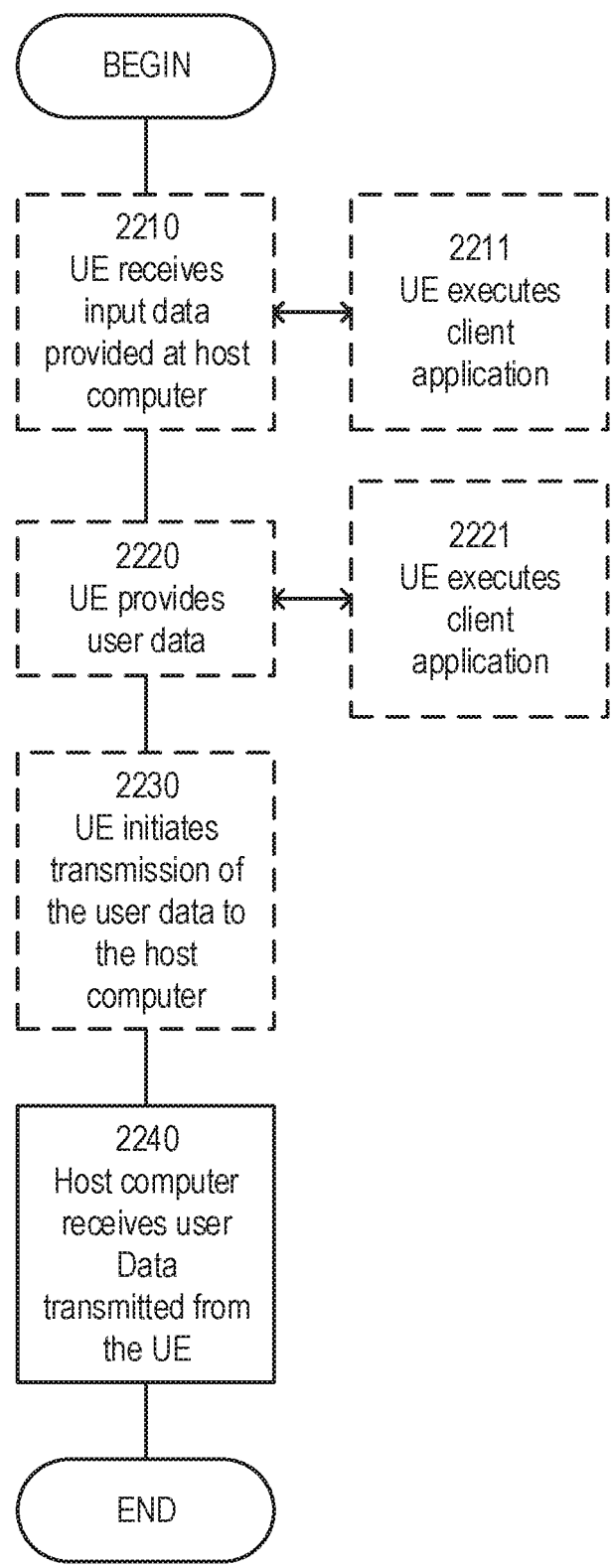
FIG. 22 illustrates methods implemented in a communication system including a host computer, a base station and a user equipment in accordance with some embodiments.

FIG. 22 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 22 will be included in this section. In step 2210 (which may be optional), the UE receives input data provided by the host computer. Additionally or alternatively, in step 2220, the UE provides user data. In substep 2221 (which may be optional) of step 2220, the UE provides the user data by executing a client application. In substep 2211 (which may be optional) of step 2210, the UE executes a client application which provides the user data in reaction to the received input data provided by the host computer. In providing the user data, the executed client application may further consider user input received from the user. Regardless of the specific manner in which the user data was provided, the UE initiates, in substep 2230 (which may be optional), transmission of the user data to the host computer. In step 2240 of the method, the host computer receives the user data transmitted from the UE, in accordance with the teachings of the embodiments described throughout this disclosure.

Figure 23:
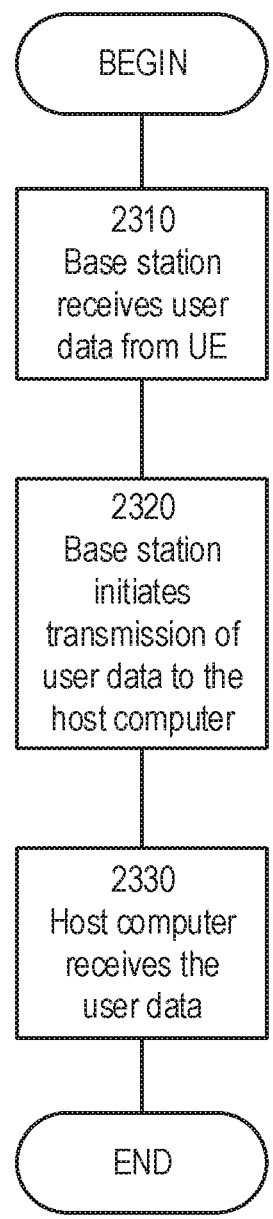
FIG. 23 illustrates methods implemented in a communication system including a host computer, a base station and a user equipment in accordance with some embodiments.

FIG. 23 illustrates methods implemented in a communication system including a host computer, a base station and a user equipment in accordance with some embodiments.

FIG. 23 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 23 will be included in this section. In step 2310 (which may be optional), in accordance with the teachings of the embodiments described throughout this disclosure, the base station receives user data from the UE. In step 2320 (which may be optional), the base station initiates transmission of the received user data to the host computer. In step 2330 (which may be optional), the host computer receives the user data carried in the transmission initiated by the base station.

Figure 24:
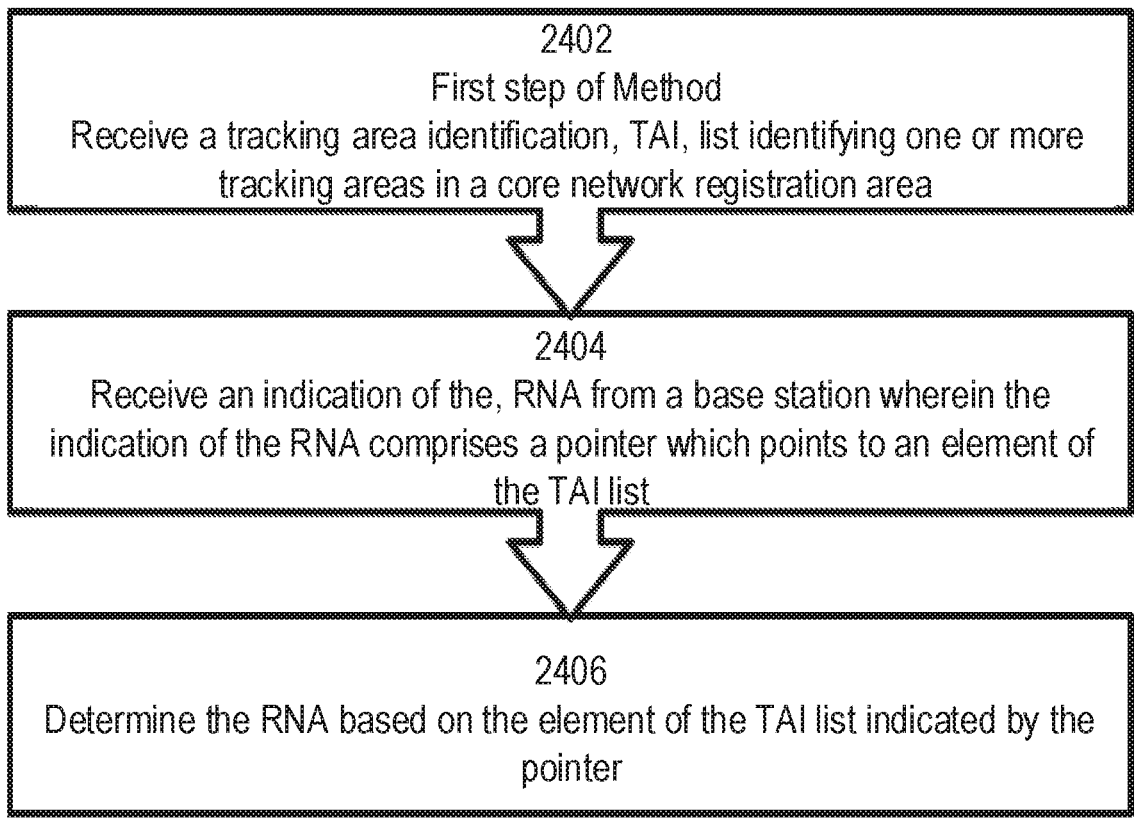
FIG. 24 illustrates a method in accordance with some embodiments.

FIG. 24 illustrates a method in accordance with some embodiments.

FIG. 24 depicts a method in accordance with particular embodiments, the method begins at step 2402 with receiving a tracking area identification, TAI, list identifying one or more tracking areas in a core network registration area. In step 2404 the method comprises receiving an indication of the RNA from a base station wherein the indication of the RNA comprises a pointer which points to an element of the TAI list. In step 2406 the method comprises determining the RNA based on the element of the TAI list indicated by the pointer.

Figure 25:
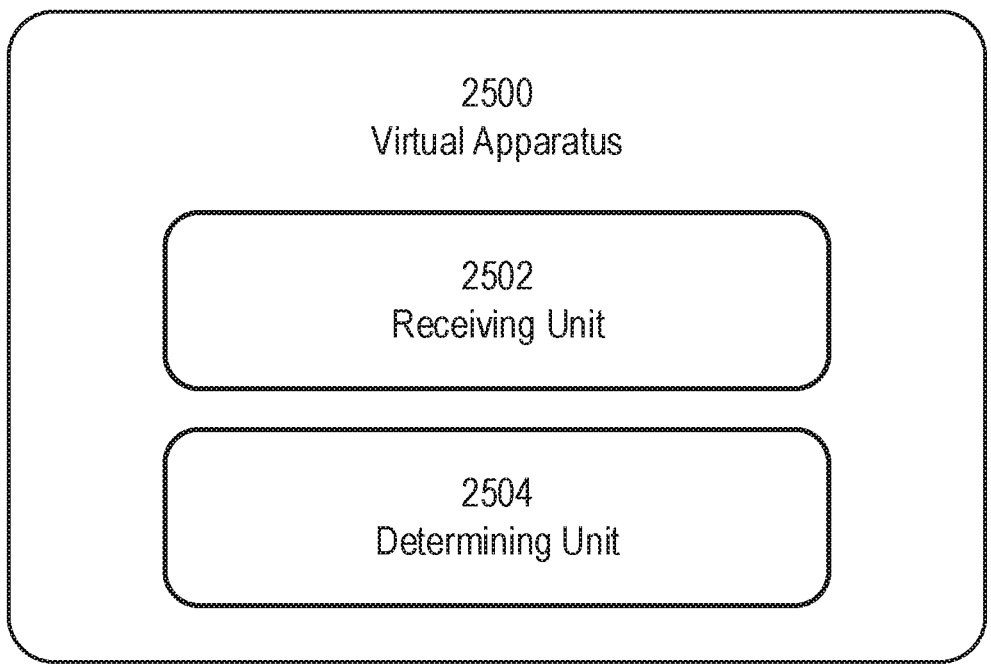
FIG. 25 illustrates a virtualization apparatus in accordance with some embodiments.

FIG. 25 illustrates a virtualization apparatus in accordance with some embodiments.

FIG. 25 illustrates a schematic block diagram of an apparatus 2500 in a wireless network (for example, the wireless network shown in FIG. 15). The apparatus may be implemented in a wireless device or network node (e.g., wireless device 1510 or network node 1560 shown in FIG. 15). Apparatus 2500 is operable to carry out the example method described with reference to FIG. 24 and possibly any other processes or methods disclosed herein. It is also to be understood that the method of FIG. 24 is not necessarily carried out solely by apparatus 2500. At least some operations of the method can be performed by one or more other entities.

Virtual Apparatus 2500 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause Receiving unit 2502, and Determining unit 2504 and any other suitable units of apparatus 2500 to perform corresponding functions according one or more embodiments of the present disclosure.

As illustrated in FIG. 25, apparatus 2500 includes Receiving unit 2502 and Determining unit 2504. The receiving unit 2502 is configured to receive a tracking area identification, TAI, list identifying one or more tracking areas in a core network registration area; and receive an indication of the RNA from a base station wherein the indication of the RNA comprises a pointer which points to an element of the TAI list. The Determining unit 2504 is configure to determine the RNA based on the element of the TAI list indicated by the pointer.

Figure 26:
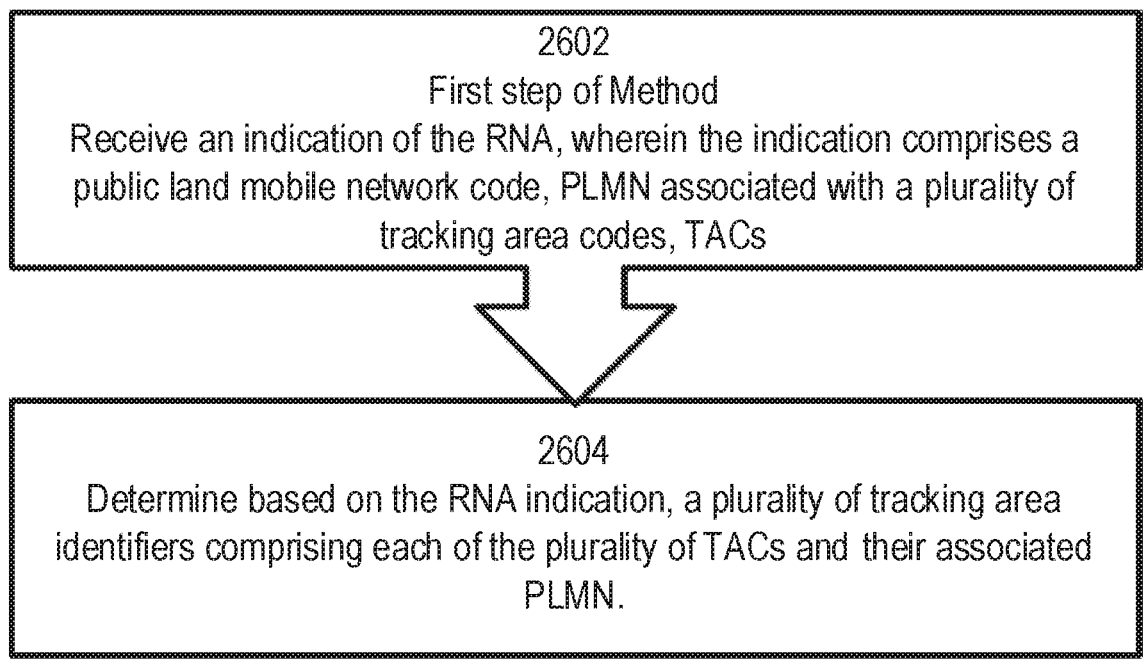
FIG. 26 illustrates a method in accordance with some embodiments.

FIG. 26 illustrates a method in accordance with some embodiments.

FIG. 26 depicts a method in accordance with particular embodiments, the method begins at step 2602 with receiving an indication of the RNA, wherein the indication comprises a public land mobile network, PLMN, code associated with a plurality of tracking area codes, TACs. In step 2604 the method comprises determining based on the RNA indication, a plurality of tracking area identifiers comprising each of the plurality of TACs and their associated PLMN.

Figure 27:
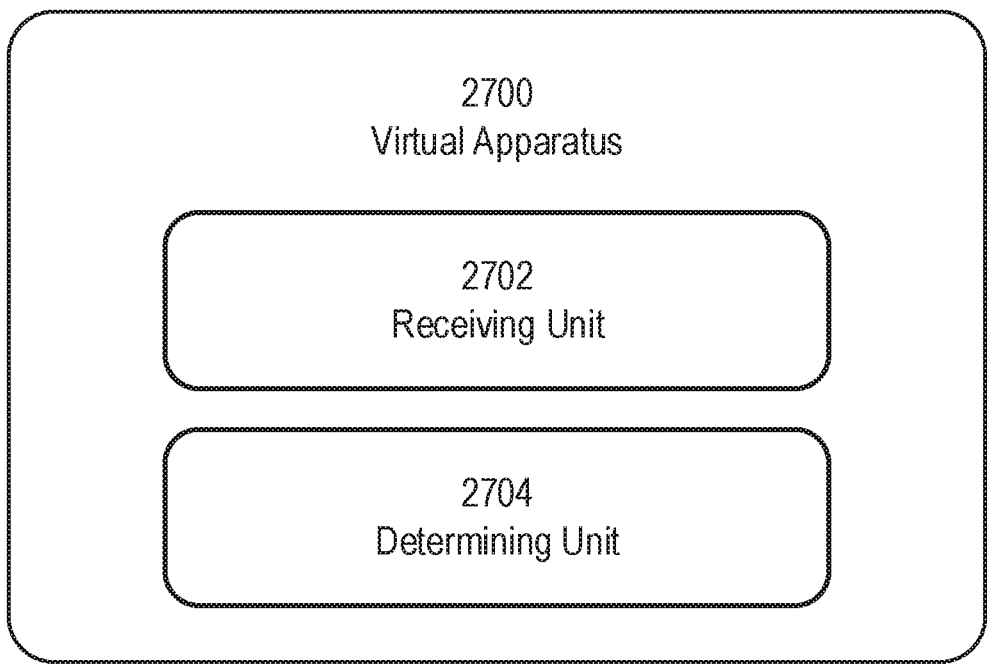
FIG. 27 illustrates a virtualization apparatus in accordance with some embodiments.

FIG. 27 illustrates a virtualization apparatus in accordance with some embodiments.

FIG. 27 illustrates a schematic block diagram of an apparatus 2700 in a wireless network (for example, the wireless network shown in FIG. 15). The apparatus may be implemented in a wireless device or network node (e.g., wireless device 1510 or network node 1560 shown in FIG.

15). Apparatus 2700 is operable to carry out the example method described with reference to FIG. 26 and possibly any other processes or methods disclosed herein. It is also to be understood that the method of FIG. 26 is not necessarily carried out solely by apparatus 2700. At least some operations of the method can be performed by one or more other entities.

Virtual Apparatus 2700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause Receiving unit 2702, and Determining unit 2704 and any other suitable units of apparatus 2700 to perform corresponding functions according one or more embodiments of the present disclosure.

As illustrated in FIG. 27, apparatus 2700 includes Receiving unit 2702 and Determining unit 2704. The receiving unit 2702 is configured to receive an indication of the RNA, wherein the indication comprises a public land mobile network code, PLMN associated with a plurality of tracking area codes, TACs. The Determining unit 2704 is configure to determine based on the RNA indication, a plurality of tracking area identifiers comprising each of the plurality of TACs and their associated PLMN.

Figure 28:
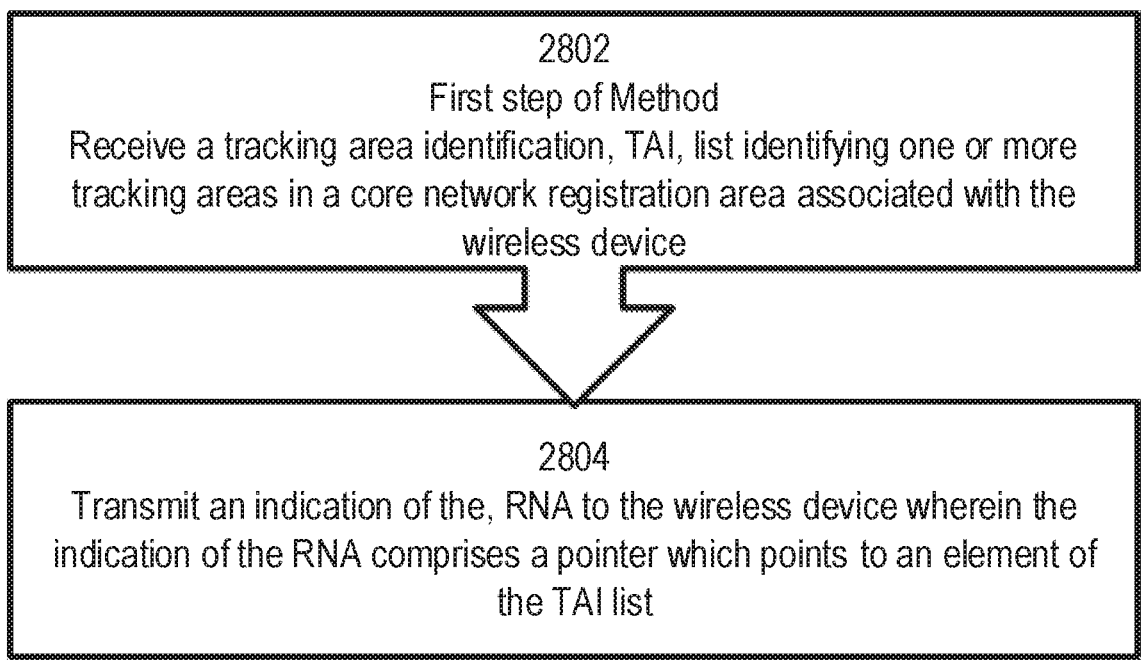
FIG. 28 illustrates a method in accordance with some embodiments.

FIG. 28 illustrates a method in accordance with some embodiments.

FIG. 28 depicts a method in accordance with particular embodiments, the method begins at step 2802 with receiving a tracking area identification, TAI, list identifying one or more tracking areas in a core network registration area associated with the wireless device. In step 2804 the method comprises transmitting an indication of the, RNA to the wireless device wherein the indication of the RNA comprises a pointer which points to an element of the TAI list.

Figure 29:
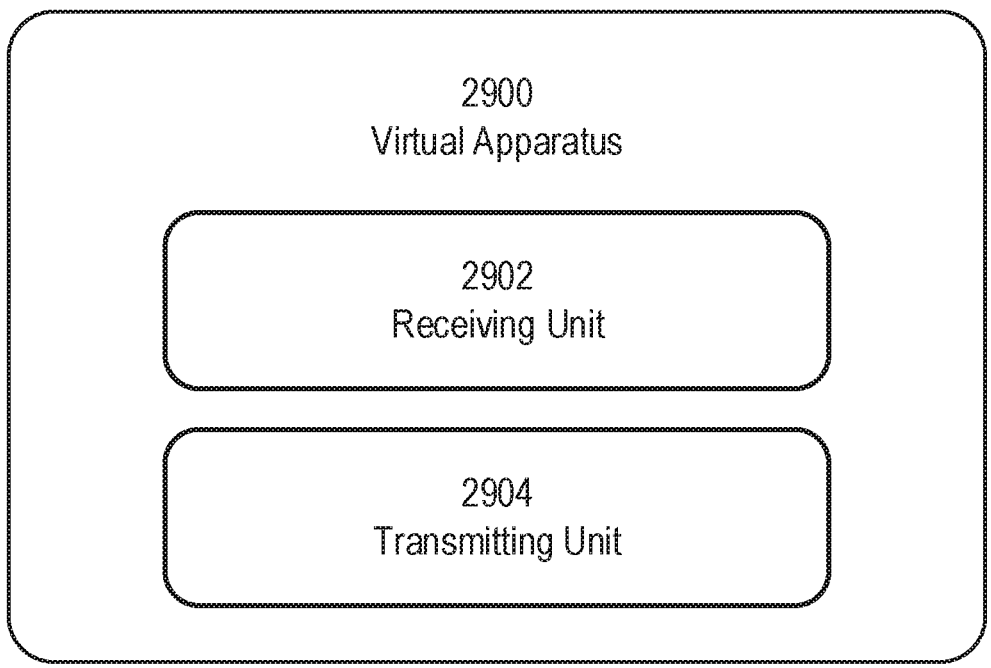
FIG. 29 illustrates a virtualization apparatus in accordance with some embodiments.

FIG. 29 illustrates a virtualization apparatus in accordance with some embodiments.

FIG. 29 illustrates a schematic block diagram of an apparatus 2900 in a wireless network (for example, the wireless network shown in FIG. 15). The apparatus may be implemented in a wireless device or network node (e.g., wireless device 1510 or network node 1560 shown in FIG. 15). Apparatus 2900 is operable to carry out the example method described with reference to FIG. 28 and possibly any other processes or methods disclosed herein. It is also to be understood that the method of FIG. 28 is not necessarily carried out solely by apparatus 2900. At least some operations of the method can be performed by one or more other entities.

Virtual Apparatus 2900 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause Receiving unit 2902, and Transmitting unit 2904 and any other suitable units of apparatus 2900 to perform corresponding functions according one or more embodiments of the present disclosure.

As illustrated in FIG. 29, apparatus 2900 includes Receiving unit 2902 and Transmitting unit 2904. The receiving unit 2902 is configured to receive a tracking area identification, TAI, list identifying one or more tracking areas in a core network registration area associated with the wireless device. The Transmitting unit 2904 is configured to transmit an indication of the, RNA to the wireless device wherein the indication of the RNA comprises a pointer which points to an element of the TAI list.

FIG. 30 illustrates a method in accordance with some embodiments.

FIG. 30 depicts a method in accordance with particular embodiments, the method begins at step 3002 with transmitting an indication of the RNA, wherein the indication comprises a public land mobile network, PLMN, code associated with a plurality of tracking area codes, TACs, to the wireless device.

Figure 31:
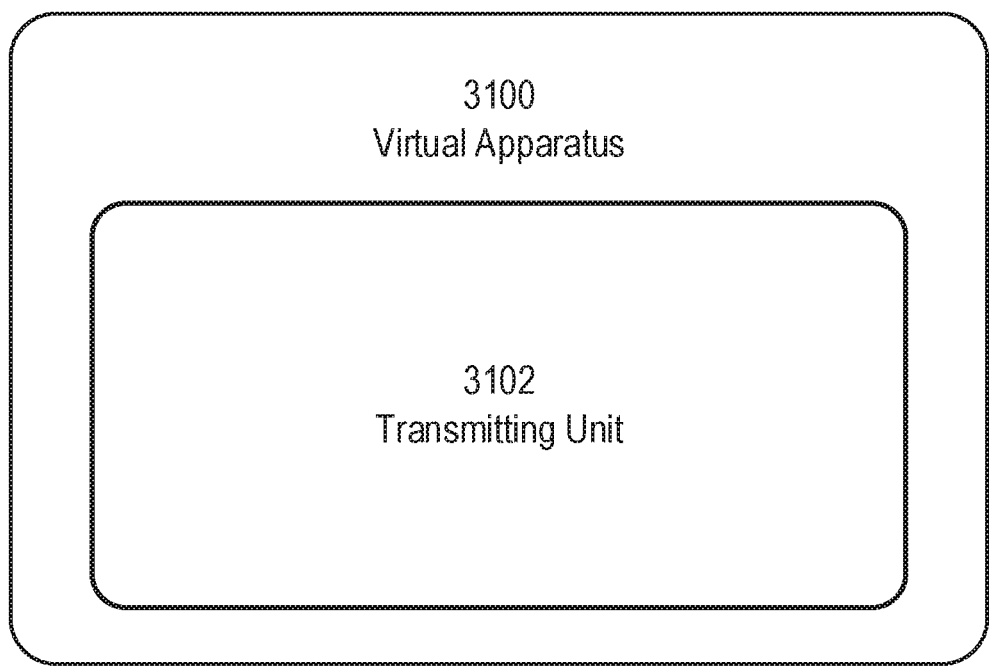
FIG. 31 illustrates a virtualization apparatus in accordance with some embodiments.

FIG. 31 illustrates a virtualization apparatus in accordance with some embodiments.

FIG. 31 illustrates a schematic block diagram of an apparatus 2900 in a wireless network (for example, the wireless network shown in FIG. 15). The apparatus may be implemented in a wireless device or network node (e.g., wireless device 1510 or network node 1560 shown in FIG. 15). Apparatus 3100 is operable to carry out the example method described with reference to FIG. 30 and possibly any other processes or methods disclosed herein. It is also to be understood that the method of FIG. 30 is not necessarily carried out solely by apparatus 3100. At least some operations of the method can be performed by one or more other entities.

Virtual Apparatus 3100 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause Transmitting unit 3102 and any other suitable units of apparatus 3100 to perform corresponding functions according one or more embodiments of the present disclosure.

As illustrated in FIG. 31, apparatus 3100 includes Transmitting unit 3102. The Transmitting unit 3102 is configured to transmit an indication of the RNA, wherein the indication comprises a public land mobile network, PLMN, code associated with a plurality of tracking area codes, TACs, to the wireless device.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

EMBODIMENTS

Group A Embodiments

1. A method performed by a wireless device for determining a radio access network notification area, RNA, in a wireless communications network, the method comprising:
   a. receiving a tracking area identification, TAI, list identifying one or more tracking areas in a core network registration area;
   b. receiving an indication of the, RNA from a base station wherein
      i. the indication of the RNA comprises a pointer which points to an element of the TAI list; and
   c. determining the RNA based on the element of the TAI list indicated by the pointer.
2. The method of embodiment 1 wherein the indication of the RNA is received as part of a control message instructing the wireless device to transition from a first mode of operation to a second mode of operation.
3. The method of embodiment 2 wherein the first mode of operation comprises RRC_CONNECTED and the second mode of operation comprises RRC_INACTIVE.
4. The method of any previous embodiment wherein the TAI list is received from a core network node.
5. The method of embodiment 4 wherein the core network node comprises an Access and Mobility Management Function, AMF, node.
6. The method of any previous embodiment wherein the pointer comprises an index indicating the position of the element in the TAI list.
7. The method of any previous embodiment wherein the pointer comprises a bitmap indicating the position of the element in the TAI list.
8. The method of any previous embodiment wherein the RNA indication further comprises at least one radio access network area code, RANAC, associated with the pointer.
9. The method of embodiment 8 wherein the at least one RANAC code is associated with the pointer by a predetermined mapping based on the positioning of the pointer and the at least one RANAC code in the RNC indication.
10. The method of embodiment 8 or 9 wherein the step of determining comprises:
    a. determining that one or more cells in the wireless communications network that are both associated with the tracking area identified by the element of the TAI, and associated with RANAC, are part of the RNA.
11. The method of any previous embodiment wherein the indication of the RNA comprises a plurality of pointers each pointing to a different element of the TAI list.
12. The method of embodiment 11 wherein the indication comprises a plurality of Radio access network area codes, RANAC, each associated with one of the plurality of pointers.
13. The method of any of the previous embodiments, further comprising:
    providing user data; and
    forwarding the user data to a host computer via the transmission to the base station.
14. A method performed by a wireless device for determining a radio access network notification area, RNA, in a wireless communications network, the method comprising:
    receiving an indication of the RNA, wherein the indication comprises a public land mobile network code, PLMN associated with a plurality of tracking area codes, TACs; and
    determining based on the RNA indication, a plurality of tracking area identifiers comprising each of the plurality of TACs and their associated PLMN.
15. The method as in embodiment 14 wherein the indication of the RNA comprises a plurality of PLMNs each associated with a plurality of TACs.
16. The method as in embodiment 14 or 15 wherein the indication of the RNA further comprises at least one radio access network area code RANAC associated with each TAC.

Group B Embodiments

17. A method performed by a base station for indicating a radio access network notification area, RNA, to a wireless device, the method comprising:
    receiving a tracking area identification, TAI, list identifying one or more tracking areas in a core network registration area associated with the wireless device; and
    transmitting an indication of the, RNA to the wireless device wherein
       i. the indication of the RNA comprises a pointer which points to an element of the TAI list.
18. The method of embodiment 17 wherein the indication of the RNA is transmitted as part of a control message instructing the wireless device to transition from a first mode of operation to a second mode of operation.
19. The method of embodiment 18 wherein the first mode of operation comprises an RRC_CONNECTED state and the second mode of operation comprises an RRC_INACTIVE state.
20. The method of any one of embodiments 17 to 19 wherein the tracking area identification list is received from a core network node.
21. The method of embodiment 20 wherein the core network node comprises an AMF.
22. The method of any one of embodiment 17 to 21 wherein the pointer comprises an index indicating the position of the element in the TAI list.
23. The method of any one of embodiments 17 to 22 wherein the pointer comprises a bitmap indicating the position of the element in the TAI list.
24. The method of any one of embodiments 17 to 23 wherein the RNA indication further comprises at least one radio access network area code, RANAC, associated with the pointer.
25. The method of embodiment 24 wherein the at least one RANAC code is associated with the pointer by a predetermined mapping based on the positioning of the pointer and the at least one RANAC code in the RNC indication.
26. The method of any one of embodiments 17 to 25 wherein the indication of the RNA comprises a plurality of pointers each pointing to a different element of the TAI list.
27. The method of embodiment 26 wherein the indication comprises a plurality of radio access network area codes, RANAC, each associated with one of the plurality of pointers.

28. The method of any of embodiments 17 to 28, further comprising:
obtaining user data; and
forwarding the user data to a host computer or a wireless device.
29. A method performed by a base station for indicating a radio access network notification area, RNA, to a wireless device in a wireless communications network, the method comprising:
transmitting an indication of the RNA, wherein the indication comprises a public land mobile network, PLMN, code associated with a plurality of tracking area codes, TACs, to the wireless device.
30. The method as in embodiment 29 wherein the indication of the RNA comprises a plurality of PLMNs each associated with a plurality of TACs.
31. The method as in embodiment 29 or 30 wherein the indication of the RNA further comprises at least one radio access network area code RANAC associated with each TAC.

Group C Embodiments

32. A wireless device for determining a radio access network notification area, RNA, the wireless device comprising:
processing circuitry configured to perform any of the steps of any of the Group A embodiments; and
power supply circuitry configured to supply power to the wireless device.
33. A base station for indicating a radio access network notification area, RNA, to a wireless device the base station comprising:
processing circuitry configured to perform any of the steps of any of the Group B embodiments;
power supply circuitry configured to supply power to the base station.
34. A user equipment (UE) for determining a radio access network notification area, RNA, the UE comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A embodiments;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.
35. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any of the steps of any of the Group B embodiments.
36. The communication system of the previous embodiment further including the base station.
37. The communication system of the previous 2 embodiments, further including the UE, wherein the UE is configured to communicate with the base station.
38. The communication system of the previous 3 embodiments, wherein:
the processing circuitry of the host computer is configured to execute a host application, thereby providing the user data; and
the UE comprises processing circuitry configured to execute a client application associated with the host application.
39. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps of any of the Group B embodiments.
40. The method of the previous embodiment, further comprising, at the base station, transmitting the user data.
41. The method of the previous 2 embodiments, wherein the user data is provided at the host computer by executing a host application, the method further comprising, at the UE, executing a client application associated with the host application.
42. A user equipment (UE) configured to communicate with a base station, the UE comprising a radio interface and processing circuitry configured to performs the of the previous 3 embodiments.
43. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's components configured to perform any of the steps of any of the Group A embodiments.
44. The communication system of the previous embodiment, wherein the cellular network further includes a base station configured to communicate with the UE.
45. The communication system of the previous 2 embodiments, wherein:
the processing circuitry of the host computer is configured to execute a host application, thereby providing the user data; and
the UE's processing circuitry is configured to execute a client application associated with the host application.
46. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs any of the steps of any of the Group A embodiments.
47. The method of the previous embodiment, further comprising at the UE, receiving the user data from the base station.
48. A communication system including a host computer comprising:
communication interface configured to receive user data originating from a transmission from a user equipment (UE) to a base station, wherein the UE comprises a radio interface and processing circuitry, the UE's processing circuitry configured to perform any of the steps of any of the Group A embodiments.

49. The communication system of the previous embodiment, further including the UE.
50. The communication system of the previous 2 embodiments, further including the base station, wherein the base station comprises a radio interface configured to communicate with the UE and a communication interface configured to forward to the host computer the user data carried by a transmission from the UE to the base station.
51. The communication system of the previous 3 embodiments, wherein:
    the processing circuitry of the host computer is configured to execute a host application; and
    the UE's processing circuitry is configured to execute a client application associated with the host application, thereby providing the user data.
52. The communication system of the previous 4 embodiments, wherein:
    the processing circuitry of the host computer is configured to execute a host application, thereby providing request data; and
    the UE's processing circuitry is configured to execute a client application associated with the host application, thereby providing the user data in response to the request data.
53. A method implemented in a communication system including a host computer, a base station and a user equipment (UE), the method comprising:
    at the host computer, receiving user data transmitted to the base station from the UE, wherein the UE performs any of the steps of any of the Group A embodiments.
54. The method of the previous embodiment, further comprising, at the UE, providing the user data to the base station.
55. The method of the previous 2 embodiments, further comprising:
    at the UE, executing a client application, thereby providing the user data to be transmitted; and
    at the host computer, executing a host application associated with the client application.
56. The method of the previous 3 embodiments, further comprising:
    at the UE, executing a client application; and
    at the UE, receiving input data to the client application, the input data being provided at the host computer by executing a host application associated with the client application,
    wherein the user data to be transmitted is provided by the client application in response to the input data.
57. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.
58. The communication system of the previous embodiment further including the base station.
59. The communication system of the previous 2 embodiments, further including the UE, wherein the UE is configured to communicate with the base station.
60. The communication system of the previous 3 embodiments, wherein:
    the processing circuitry of the host computer is configured to execute a host application;
    the UE is configured to execute a client application associated with the host application, thereby providing the user data to be received by the host computer.
61. A method implemented in a communication system including a host computer, a base station and a user equipment (UE), the method comprising:
    at the host computer, receiving, from the base station, user data originating from a transmission which the base station has received from the UE, wherein the UE performs any of the steps of any of the Group A embodiments.
62. The method of the previous embodiment, further comprising at the base station, receiving the user data from the UE.
63. The method of the previous 2 embodiments, further comprising at the base station, initiating a transmission of the received user data to the host computer.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

1xRTT CDMA2000 1x Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDUCommon Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method performed by a wireless device for determining a radio access network notification area (RNA) in a wireless communications network, the method comprising:
receiving an indication of the RNA, wherein the indication comprises a public land mobile network code (PLMN) associated with a plurality of tracking area codes (TACs); and
determining, based on the RNA indication, a plurality of tracking area identifiers comprising each of the plurality of TACs and their associated PLMN.

2. The method as in claim 1 wherein the indication of the RNA comprises a plurality of PLMNs, each PLMN associated with a plurality of TACs.

3. The method as in claim 1 wherein the indication of the RNA further comprises at least one radio access network area code (RANAC) associated with each TAC.

4. A method performed by a base station for indicating a radio access network notification area (RNA) to a wireless device in a wireless communications network, the method comprising:
transmitting an indication of the RNA, wherein the indication comprises a public land mobile network (PLMN) code associated with a plurality of tracking area codes (TACs) to the wireless device.

5. The method as in claim 4 wherein the indication of the RNA comprises a plurality of PLMNs each associated with a plurality of TACs.

6. The method as in claim 4 wherein the indication of the RNA further comprises at least one radio access network area code RANAC associated with each TAC.

7. A wireless device for determining a radio access network notification area (RNA) in a wireless communications network, the wireless device comprising processing circuitry configured to:
receive an indication of the RNA, wherein the indication comprises a public land mobile network code (PLMN) associated with a plurality of tracking area codes (TACs); and
determine based on the RNA indication, a plurality of tracking area identifiers comprising each of the plurality of TACs and their associated PLMN.

8. The wireless device as in claim 7 wherein the indication of the RNA comprises a plurality of PLMNs, each PLMN associated with a plurality of TACs.

9. The wireless device as in claim 7 wherein the indication of the RNA further comprises at least one radio access network area code (RANAC) associated with each TAC.

10. A base station for indicating a radio access network notification area (RNA) to a wireless device in a wireless communications network, the base station comprising processing circuitry configured to:
    transmit an indication of the RNA, wherein the indication comprises a public land mobile network code (PLMN) associated with a plurality of tracking area codes (TACs) to the wireless device.

11. The base station as in claim 10 wherein the indication of the RNA comprises a plurality of PLMNs, each PLMN associated with a plurality of TACs.

12. The base station as in claim 11 wherein the indication of the RNA further comprises at least one radio access network area code RANAC associated with each TAC.

* * * * *